US 10,482,532 B1

(12) United States Patent
Kapczynski

(10) Patent No.: US 10,482,532 B1
(45) Date of Patent: Nov. 19, 2019

(54) PROVIDING CREDIT DATA IN SEARCH RESULTS

(71) Applicant: ConsumerInfo.com, Inc., Costa Mesa, CA (US)

(72) Inventor: Mark Joseph Kapczynski, Santa Monica, CA (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 0 days.

(21) Appl. No.: 15/848,704

(22) Filed: Dec. 20, 2017

Related U.S. Application Data

(63) Continuation of application No. 14/254,561, filed on Apr. 16, 2014, now Pat. No. 9,892,457.

(51) Int. Cl.
    *G06Q 40/02* (2012.01)

(52) U.S. Cl.
    CPC ........... *G06Q 40/025* (2013.01); *G06Q 40/02* (2013.01)

(58) Field of Classification Search
    CPC ......... G06F 17/30864; G06F 17/30867; G06F 17/3053; G06Q 20/04
    USPC ................................. 707/732, 706
    See application file for complete search history.

(56) References Cited

U.S. PATENT DOCUMENTS

| | | |
|---|---|---|
| 3,405,457 A | 10/1968 | Bitzer |
| 4,346,442 A | 8/1982 | Musmanno |
| 4,734,858 A | 3/1988 | Schlafly |
| 4,755,940 A | 7/1988 | Brachtl et al. |
| 4,774,664 A | 9/1988 | Campbell et al. |
| 4,827,508 A | 5/1989 | Shear |
| 4,891,503 A | 1/1990 | Jewell |
| 4,977,595 A | 12/1990 | Ohta et al. |
| 4,989,141 A | 1/1991 | Lyons et al. |
| 5,126,936 A | 6/1992 | Champion et al. |
| 5,148,365 A | 9/1992 | Dembo |
| 5,220,501 A | 6/1993 | Lawlor et al. |
| 5,262,941 A | 11/1993 | Saladin |
| 5,274,547 A | 12/1993 | Zoffel et al. |

(Continued)

FOREIGN PATENT DOCUMENTS

| | | |
|---|---|---|
| CA | 2509842 | 12/2005 |
| EP | 0 542 298 | 5/1993 |

(Continued)

OTHER PUBLICATIONS

U.S. Appl. No. 14/254,561, U.S. Pat. No. 9,892,457, Providing Credit Data in Search Results, filed Apr. 16, 2014.

(Continued)

*Primary Examiner* — Daniel S Felten
(74) *Attorney, Agent, or Firm* — Knobbe, Martens, Olson & Bear, LLP

(57) ABSTRACT

A credit report system is disclosed which may provide credit data to a consumer in the consumer's search results or at other times when credit data may be useful to a consumer. Searches relevant to credit data may be determined based on the search terms entered, or based on the results of the search. Credit data may be provided if the consumer accesses webpages relevant to credit reports or credit scores. The credit report system may also authenticate the consumer's identity before providing credit data to the consumer. Credit data may include the consumer's credit score as well as other information such as credit report data that may be useful to a consumer.

15 Claims, 14 Drawing Sheets

(56) References Cited

U.S. PATENT DOCUMENTS

| | | |
|---|---|---|
| 5,336,870 A | 8/1994 | Hughes et al. |
| 5,351,186 A | 9/1994 | Bullock et al. |
| 5,361,201 A | 11/1994 | Jost et al. |
| 5,383,113 A | 1/1995 | Kight et al. |
| 5,404,518 A | 4/1995 | Gilbertson et al. |
| 5,500,513 A | 3/1996 | Langhans et al. |
| 5,563,783 A | 10/1996 | Stolfo et al. |
| 5,590,038 A | 12/1996 | Pitroda |
| 5,592,560 A | 1/1997 | Deaton et al. |
| 5,621,201 A | 4/1997 | Langhans et al. |
| 5,640,577 A | 6/1997 | Scharmer |
| 5,659,725 A | 8/1997 | Levy et al. |
| 5,659,731 A | 8/1997 | Gustafson |
| 5,689,651 A | 11/1997 | Lozman |
| 5,719,941 A | 2/1998 | Swift et al. |
| 5,729,735 A | 3/1998 | Meyering |
| 5,739,512 A | 4/1998 | Tognazzini |
| 5,754,632 A | 5/1998 | Smith |
| 5,819,234 A | 10/1998 | Slavin et al. |
| 5,832,068 A | 11/1998 | Smith |
| 5,842,211 A | 11/1998 | Horadan et al. |
| 5,844,218 A | 12/1998 | Kawan et al. |
| 5,857,174 A | 1/1999 | Dugan |
| 5,864,620 A | 1/1999 | Pettitt |
| 5,870,721 A | 2/1999 | Norris |
| 5,878,403 A | 3/1999 | DeFrancesco |
| 5,881,131 A | 3/1999 | Farris et al. |
| 5,884,302 A | 3/1999 | Ho |
| 5,903,830 A | 5/1999 | Joao et al. |
| 5,903,881 A | 5/1999 | Schrader et al. |
| 5,930,776 A | 7/1999 | Dykstra et al. |
| 5,953,710 A | 9/1999 | Fleming |
| 5,956,693 A | 9/1999 | Geerlings |
| 5,963,939 A | 10/1999 | McCann et al. |
| 5,966,695 A | 10/1999 | Melchione et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,415 A | 12/1999 | Shurling et al. |
| 6,014,645 A | 1/2000 | Cunningham |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,038,551 A | 3/2000 | Barlow et al. |
| 6,055,570 A | 4/2000 | Nielsen |
| 6,064,990 A | 5/2000 | Goldsmith |
| 6,072,894 A | 6/2000 | Payne |
| 6,073,140 A | 6/2000 | Morgan et al. |
| 6,085,242 A | 7/2000 | Chandra |
| 6,088,686 A | 7/2000 | Walker et al. |
| 6,112,190 A | 8/2000 | Fletcher et al. |
| 6,115,694 A | 9/2000 | Cheetham et al. |
| 6,119,103 A | 9/2000 | Basch et al. |
| 6,128,602 A | 10/2000 | Northington et al. |
| 6,149,441 A | 11/2000 | Pellegrino et al. |
| 6,157,707 A | 12/2000 | Baulier et al. |
| 6,161,139 A | 12/2000 | Win et al. |
| 6,173,272 B1 | 1/2001 | Thomas et al. |
| 6,178,420 B1 | 1/2001 | Sassano |
| 6,182,068 B1 | 1/2001 | Culliss |
| 6,182,229 B1 | 1/2001 | Nielsen |
| 6,202,053 B1 | 3/2001 | Christiansen et al. |
| 6,202,067 B1 | 3/2001 | Blood et al. |
| 6,233,566 B1 | 5/2001 | Levine et al. |
| 6,233,588 B1 | 5/2001 | Marchoili et al. |
| 6,247,000 B1 | 6/2001 | Hawkins et al. |
| 6,254,000 B1 | 7/2001 | Degen et al. |
| 6,263,447 B1 | 7/2001 | French et al. |
| 6,278,993 B1 | 8/2001 | Kumar et al. |
| 6,282,658 B2 | 8/2001 | French et al. |
| 6,289,452 B1 | 9/2001 | Arnold et al. |
| 6,295,541 B1 | 9/2001 | Bodnar et al. |
| 6,304,860 B1 | 10/2001 | Martin et al. |
| 6,311,169 B2 | 10/2001 | Duhon |
| 6,321,339 B1 | 11/2001 | French et al. |
| 6,327,578 B1 | 12/2001 | Linehan |
| 6,330,551 B1 | 12/2001 | Burchetta et al. |
| 6,343,279 B1 | 1/2002 | Bissonette et al. |
| 6,353,778 B1 | 3/2002 | Brown |
| 6,356,937 B1 | 3/2002 | Montville et al. |
| 6,374,262 B1 | 4/2002 | Kodama |
| 6,384,844 B1 | 5/2002 | Stewart et al. |
| 6,386,444 B1 | 5/2002 | Sullivan |
| 6,397,197 B1 | 5/2002 | Gindlesperger |
| 6,397,212 B1 | 5/2002 | Biffar |
| 6,405,181 B2 | 6/2002 | Lent et al. |
| 6,408,282 B1 | 6/2002 | Buist |
| 6,412,073 B1 | 6/2002 | Rangan |
| 6,421,675 B1 | 7/2002 | Ryan et al. |
| 6,421,729 B1 | 7/2002 | Paltenghe et al. |
| 6,422,462 B1 | 7/2002 | Cohen |
| 6,453,353 B1 | 9/2002 | Win et al. |
| 6,457,012 B1 | 9/2002 | Jatkowski |
| 6,473,740 B2 | 10/2002 | Cockril et al. |
| 6,496,936 B1 | 12/2002 | French et al. |
| 5,870,721 C1 | 1/2003 | Norris |
| 6,505,168 B1 | 1/2003 | Rothman et al. |
| 6,510,451 B2 | 1/2003 | Wu et al. |
| 6,523,021 B1 | 2/2003 | Monberg et al. |
| 6,523,041 B1 | 2/2003 | Morgan et al. |
| 6,539,377 B1 | 3/2003 | Culliss |
| 6,539,392 B1 | 3/2003 | Rebane |
| 6,543,683 B2 | 4/2003 | Hoffman |
| 6,549,904 B1 | 4/2003 | Ortega et al. |
| 6,564,210 B1 | 5/2003 | Korda et al. |
| 6,567,791 B2 | 5/2003 | Lent et al. |
| 6,571,236 B1 | 5/2003 | Ruppelt |
| 6,574,736 B1 | 6/2003 | Andrews |
| 6,581,025 B2 | 6/2003 | Lehman |
| 6,587,841 B1 | 7/2003 | DeFrancesco |
| 6,594,766 B2 | 7/2003 | Rangan et al. |
| 6,611,816 B2 | 8/2003 | Lebda et al. |
| 6,615,193 B1 | 9/2003 | Kingdon et al. |
| 6,622,131 B1 | 9/2003 | Brown et al. |
| 6,629,245 B1 | 9/2003 | Stone et al. |
| 6,647,383 B1 | 11/2003 | August et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,703,930 B2 | 3/2004 | Skinner |
| 6,714,944 B1 | 3/2004 | Shapiro et al. |
| 6,718,313 B1 | 4/2004 | Lent et al. |
| 6,725,381 B1 | 4/2004 | Smith et al. |
| 6,738,804 B1 | 5/2004 | Lo |
| 6,745,938 B2 | 6/2004 | Sullivan |
| 6,748,426 B1 | 6/2004 | Shaffer et al. |
| 6,750,985 B2 | 6/2004 | Rhoads |
| 6,766,304 B2 | 7/2004 | Kemp et al. |
| 6,766,327 B2 | 7/2004 | Morgan, Jr. et al. |
| 6,772,132 B1 | 8/2004 | Kemp et al. |
| 6,781,608 B1 | 8/2004 | Crawford |
| 6,782,379 B2 | 8/2004 | Lee |
| 6,792,088 B2 | 9/2004 | Takeuchi |
| 6,792,263 B1 | 9/2004 | Kite |
| 6,795,812 B1 | 9/2004 | Lent et al. |
| 6,796,497 B2 | 9/2004 | Benkert et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,810,323 B1 | 10/2004 | Bullock et al. |
| 6,816,850 B2 | 11/2004 | Culliss |
| 6,816,871 B2 | 11/2004 | Lee |
| 6,823,319 B1 | 11/2004 | Lynch et al. |
| 6,829,639 B1 | 12/2004 | Lawson et al. |
| 6,842,782 B1 | 1/2005 | Malik et al. |
| 6,845,448 B1 | 1/2005 | Chaganti et al. |
| 6,857,073 B2 | 2/2005 | French et al. |
| 6,859,212 B2 | 2/2005 | Kumar et al. |
| 6,871,287 B1 | 3/2005 | Ellingson |
| 6,892,307 B1 | 5/2005 | Wood et al. |
| 6,898,574 B1 | 5/2005 | Regan |
| 6,900,731 B2 | 5/2005 | Kreiner et al. |

(56) References Cited

U.S. PATENT DOCUMENTS

| | | |
|---|---|---|
| 6,910,624 B1 | 6/2005 | Natsuno |
| 6,928,487 B2 | 8/2005 | Eggebraaten et al. |
| 6,934,714 B2 | 8/2005 | Meinig |
| 6,938,011 B1 | 8/2005 | Kemp et al. |
| 6,941,323 B1 | 9/2005 | Galperin |
| 6,947,989 B2 | 9/2005 | Gullotta et al. |
| 6,950,807 B2 | 9/2005 | Brock |
| 6,954,757 B2 | 10/2005 | Zargham et al. |
| 6,957,336 B2 | 10/2005 | Wheeler et al. |
| 6,962,336 B2 | 11/2005 | Glass |
| 6,963,857 B1 | 11/2005 | Johnson |
| 6,965,881 B1 | 11/2005 | Brickell et al. |
| 6,968,319 B1 | 11/2005 | Remington et al. |
| 6,973,462 B2 | 12/2005 | Dattero et al. |
| 6,985,887 B1 | 1/2006 | Sunstein et al. |
| 6,988,082 B1 | 1/2006 | Williams et al. |
| 6,988,085 B2 | 1/2006 | Hedy |
| 6,990,591 B1 | 1/2006 | Pearson |
| 6,993,504 B1 | 1/2006 | Friesen et al. |
| 6,993,572 B2 | 1/2006 | Ross, Jr. et al. |
| 6,993,596 B2 | 1/2006 | Hinton et al. |
| 6,996,542 B1 | 2/2006 | Landry |
| 6,999,941 B1 | 2/2006 | Agarwal |
| 7,013,315 B1 | 3/2006 | Boothby |
| 7,016,907 B2 | 3/2006 | Boreham et al. |
| 7,024,548 B1 | 4/2006 | O'Toole, Jr. |
| 7,028,013 B2 | 4/2006 | Saeki |
| 7,028,052 B2 | 4/2006 | Chapman et al. |
| 7,039,607 B2 | 5/2006 | Watarai et al. |
| 7,043,476 B2 | 5/2006 | Robson |
| 7,046,139 B2 | 5/2006 | Kuhn et al. |
| 7,050,989 B1 | 5/2006 | Hurt et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,065,566 B2 | 6/2006 | Menard et al. |
| 7,069,240 B2 | 6/2006 | Spero et al. |
| 7,072,909 B2 | 7/2006 | Polk |
| 7,076,462 B1 | 7/2006 | Nelson et al. |
| 7,085,727 B2 | 8/2006 | VanOrman |
| 7,089,594 B2 | 8/2006 | Lal et al. |
| 7,107,241 B1 | 9/2006 | Pinto |
| 7,107,285 B2 | 9/2006 | Von Kaenel et al. |
| 7,110,978 B1 | 9/2006 | Chin |
| 7,117,172 B1 | 10/2006 | Black |
| 7,124,144 B2 | 10/2006 | Christianson et al. |
| 7,127,424 B2 | 10/2006 | Kemp et al. |
| 7,143,063 B2 | 11/2006 | Lent |
| 7,155,725 B1 | 12/2006 | Kister et al. |
| 7,155,739 B2 | 12/2006 | Bari et al. |
| 7,174,455 B1 | 2/2007 | Arnold et al. |
| 7,181,418 B1 | 2/2007 | Zucker et al. |
| 7,181,427 B1 | 2/2007 | DeFrancesco |
| 7,194,416 B1 | 3/2007 | Provost et al. |
| 7,200,602 B2 | 4/2007 | Jonas |
| 7,200,804 B1 | 4/2007 | Khavari et al. |
| 7,206,768 B1 | 4/2007 | deGroeve et al. |
| 7,209,895 B2 | 4/2007 | Kundtz et al. |
| 7,209,911 B2 | 4/2007 | Boothby et al. |
| 7,212,995 B2 | 5/2007 | Schulkins |
| 7,212,999 B2 | 5/2007 | Friesen et al. |
| 7,218,912 B2 | 5/2007 | Erskine et al. |
| 7,219,107 B2 | 5/2007 | Beringer |
| 7,222,369 B2 | 5/2007 | Vering et al. |
| 7,228,289 B2 | 6/2007 | Brumfield et al. |
| 7,234,156 B2 | 6/2007 | French et al. |
| 7,236,950 B2 | 6/2007 | Savage et al. |
| 7,243,369 B2 | 7/2007 | Bhat et al. |
| 7,246,740 B2 | 7/2007 | Swift et al. |
| 7,249,076 B1 | 7/2007 | Pendleton et al. |
| 7,249,113 B1 | 7/2007 | Continelli et al. |
| 7,263,497 B1 | 8/2007 | Wiser et al. |
| 7,281,652 B2 | 10/2007 | Foss |
| 7,289,971 B1 | 10/2007 | O'Neil et al. |
| 7,296,734 B2 | 11/2007 | Pliha |
| 7,302,272 B2 | 11/2007 | Ackley |
| 7,310,611 B2 | 12/2007 | Shibuya et al. |
| 7,310,617 B1 | 12/2007 | Cunningham |
| 7,310,618 B2 | 12/2007 | Libman |
| 7,313,813 B2 | 12/2007 | Rangan et al. |
| 7,314,167 B1 | 1/2008 | Kiliccote |
| 7,315,837 B2 | 1/2008 | Sloan et al. |
| 7,328,233 B2 | 2/2008 | Salim et al. |
| 7,328,435 B2 | 2/2008 | Trifon |
| 7,330,717 B2 | 2/2008 | Gidron et al. |
| 7,330,835 B2 | 2/2008 | Deggendorf |
| 7,333,635 B2 | 2/2008 | Tsantes et al. |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,356,503 B1 | 4/2008 | Johnson et al. |
| 7,356,516 B2 | 4/2008 | Richey et al. |
| 7,366,694 B2 | 4/2008 | Lazerson |
| 7,366,759 B2 | 4/2008 | Trevithick |
| 7,370,014 B1 | 5/2008 | Vasavada et al. |
| 7,370,044 B2 | 5/2008 | Mulhern et al. |
| 7,373,324 B1 | 5/2008 | Engin et al. |
| 7,383,988 B2 | 6/2008 | Slonecker, Jr. |
| 7,386,511 B2 | 6/2008 | Buchanan et al. |
| 7,386,786 B2 | 6/2008 | Davis et al. |
| 7,389,913 B2 | 6/2008 | Starrs |
| 7,395,241 B1 | 7/2008 | Cook et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,433,864 B2 | 10/2008 | Malik |
| 7,437,679 B2 | 10/2008 | Uemura et al. |
| 7,444,518 B1 | 10/2008 | Dharmarajan et al. |
| 7,447,663 B1 | 11/2008 | Barker et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,475,032 B1 | 1/2009 | Patnode et al. |
| 7,479,949 B2 | 1/2009 | Jobs et al. |
| 7,480,631 B1 | 1/2009 | Merced et al. |
| 7,490,356 B2 | 2/2009 | Lieblich et al. |
| RE40,692 E | 3/2009 | Rose, Jr. |
| 7,503,489 B2 | 3/2009 | Heffez |
| 7,505,931 B2 | 3/2009 | Silva |
| 7,509,117 B2 | 3/2009 | Yum |
| 7,509,278 B2 | 3/2009 | Jones |
| 7,512,221 B2 | 3/2009 | Toms |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,348 B2 | 5/2009 | Shao et al. |
| 7,542,922 B2 | 6/2009 | Bennett et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,080 B1 | 6/2009 | Willard et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,555,459 B2 | 6/2009 | Dhar et al. |
| 7,558,748 B2 | 7/2009 | Ehring et al. |
| 7,558,795 B2 | 7/2009 | Malik et al. |
| 7,559,217 B2 | 7/2009 | Bass |
| 7,562,184 B2 | 7/2009 | Henmi et al. |
| 7,562,382 B2 | 7/2009 | Hinton et al. |
| 7,562,814 B1 | 7/2009 | Shao et al. |
| 7,571,138 B2 | 8/2009 | Miri et al. |
| 7,571,322 B2 | 8/2009 | Karoubi |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |

(56) References Cited

U.S. PATENT DOCUMENTS

| | | | |
|---|---|---|---|
| 7,584,126 B1 | 9/2009 | White | |
| 7,584,146 B1 * | 9/2009 | Duhon | G06Q 20/04 705/35 |
| 7,587,368 B2 | 9/2009 | Felsher | |
| 7,593,891 B2 | 9/2009 | Kornegay et al. | |
| 7,594,019 B2 | 9/2009 | Clapper | |
| 7,596,716 B2 | 9/2009 | Frost et al. | |
| 7,606,752 B2 | 10/2009 | Hazlehurst et al. | |
| 7,610,216 B1 | 10/2009 | May et al. | |
| 7,610,229 B1 | 10/2009 | Kornegay | |
| 7,613,600 B2 | 11/2009 | Krane | |
| 7,620,596 B2 | 11/2009 | Knudson et al. | |
| 7,620,602 B2 | 11/2009 | Jakstadt et al. | |
| 7,620,653 B1 | 11/2009 | Swartz | |
| 7,623,844 B2 | 11/2009 | Herrmann et al. | |
| 7,630,903 B1 | 12/2009 | Vaidyanathan | |
| 7,630,932 B2 | 12/2009 | Danaher et al. | |
| 7,630,933 B2 | 12/2009 | Peterson et al. | |
| 7,634,737 B2 | 12/2009 | Beringer et al. | |
| 7,640,200 B2 | 12/2009 | Gardner et al. | |
| 7,640,209 B1 | 12/2009 | Brooks et al. | |
| 7,644,023 B2 | 1/2010 | Kumar et al. | |
| 7,644,035 B1 | 1/2010 | Biffle et al. | |
| 7,647,274 B2 | 1/2010 | Peterson et al. | |
| 7,647,344 B2 | 1/2010 | Skurtovich, Jr. et al. | |
| 7,653,592 B1 | 1/2010 | Flaxman et al. | |
| 7,653,600 B2 | 1/2010 | Gustin | |
| 7,653,688 B2 | 1/2010 | Bittner | |
| 7,665,657 B2 | 2/2010 | Huh | |
| 7,672,833 B2 | 3/2010 | Blume et al. | |
| 7,676,410 B2 | 3/2010 | Petralia | |
| 7,685,209 B1 | 3/2010 | Norton et al. | |
| 7,685,525 B2 | 3/2010 | Kumar et al. | |
| 7,686,214 B1 | 3/2010 | Shao et al. | |
| 7,688,813 B2 | 3/2010 | Shin et al. | |
| 7,689,487 B1 | 3/2010 | Britto et al. | |
| 7,689,505 B2 | 3/2010 | Kasower | |
| 7,689,563 B1 | 3/2010 | Jacobson | |
| 7,690,032 B1 | 3/2010 | Peirce | |
| 7,693,787 B2 | 4/2010 | Provinse | |
| 7,698,214 B1 | 4/2010 | Lindgren | |
| 7,698,217 B1 | 4/2010 | Phillips et al. | |
| 7,707,117 B1 | 4/2010 | Jimenez et al. | |
| 7,707,122 B2 | 4/2010 | Hull et al. | |
| 7,707,271 B2 | 4/2010 | Rudkin et al. | |
| 7,708,190 B2 | 5/2010 | Brandt et al. | |
| 7,711,635 B2 | 5/2010 | Steele et al. | |
| 7,711,707 B2 | 5/2010 | Kelley | |
| 7,715,832 B2 | 5/2010 | Zhou | |
| 7,720,705 B2 | 5/2010 | Stein | |
| 7,720,846 B1 | 5/2010 | Bayliss | |
| 7,725,385 B2 | 5/2010 | Royer et al. | |
| 7,729,283 B2 | 6/2010 | Ferguson et al. | |
| 7,729,959 B1 | 6/2010 | Wells et al. | |
| 7,730,078 B2 | 6/2010 | Schwabe et al. | |
| 7,734,522 B2 | 6/2010 | Johnson et al. | |
| 7,734,541 B2 | 6/2010 | Kumar et al. | |
| 7,734,637 B2 | 6/2010 | Greifeneder et al. | |
| 7,739,193 B2 | 6/2010 | Zimmer et al. | |
| 7,739,707 B2 | 6/2010 | Sie et al. | |
| 7,747,520 B2 | 6/2010 | Livermore et al. | |
| 7,747,521 B2 | 6/2010 | Serio | |
| 7,756,789 B2 | 7/2010 | Welker et al. | |
| 7,761,373 B2 | 7/2010 | Metz | |
| 7,761,384 B2 | 7/2010 | Madhogarhia | |
| 7,765,148 B2 | 7/2010 | German et al. | |
| 7,765,166 B2 | 7/2010 | Beringer et al. | |
| 7,769,697 B2 | 8/2010 | Fieschi et al. | |
| 7,769,998 B2 | 8/2010 | Lynch et al. | |
| 7,774,257 B2 | 8/2010 | Maggioncalda et al. | |
| 7,774,270 B1 | 8/2010 | MacCloskey | |
| 7,783,515 B1 | 8/2010 | Kumar et al. | |
| 7,787,869 B2 | 8/2010 | Rice et al. | |
| 7,788,040 B2 | 8/2010 | Haskell et al. | |
| 7,792,715 B1 | 9/2010 | Kasower | |
| 7,792,725 B2 | 9/2010 | Booraem et al. | |
| 7,792,747 B2 | 9/2010 | Chin | |
| 7,792,903 B2 | 9/2010 | Fischer et al. | |
| 7,793,835 B1 | 9/2010 | Coggeshall et al. | |
| 7,797,252 B2 | 9/2010 | Rosskamm et al. | |
| 7,801,807 B2 | 9/2010 | DeFrancesco et al. | |
| 7,801,811 B1 | 9/2010 | Merrell et al. | |
| 7,801,896 B2 | 9/2010 | Szabo | |
| 7,801,956 B1 | 9/2010 | Cumberbatch et al. | |
| 7,802,104 B2 | 9/2010 | Dickinson | |
| 7,805,362 B1 | 9/2010 | Merrell et al. | |
| 7,809,398 B2 | 10/2010 | Pearson | |
| 7,809,797 B2 | 10/2010 | Cooley et al. | |
| 7,810,036 B2 | 10/2010 | Bales et al. | |
| 7,814,002 B2 | 10/2010 | DeFrancesco et al. | |
| 7,814,005 B2 | 10/2010 | Imrey et al. | |
| 7,818,228 B1 | 10/2010 | Coulter | |
| 7,818,229 B2 | 10/2010 | Imrey et al. | |
| 7,827,108 B2 | 11/2010 | Perlman et al. | |
| 7,827,115 B2 | 11/2010 | Weller et al. | |
| 7,831,609 B1 * | 11/2010 | Alexander | G06F 16/9566 707/765 |
| 7,832,006 B2 | 11/2010 | Chen et al. | |
| 7,835,983 B2 | 11/2010 | Lefner et al. | |
| 7,835,990 B2 | 11/2010 | Coleman | |
| 7,840,484 B2 | 11/2010 | Haggerty et al. | |
| 7,841,004 B1 | 11/2010 | Balducci et al. | |
| 7,841,008 B1 | 11/2010 | Cole et al. | |
| 7,844,520 B1 | 11/2010 | Franklin | |
| 7,844,604 B2 | 11/2010 | Baio et al. | |
| 7,848,972 B1 | 12/2010 | Sharma | |
| 7,848,978 B2 | 12/2010 | Imrey et al. | |
| 7,849,014 B2 | 12/2010 | Erikson | |
| 7,853,493 B2 | 12/2010 | DeBie et al. | |
| 7,853,522 B2 | 12/2010 | Chin | |
| 7,856,203 B2 | 12/2010 | Lipovski | |
| 7,856,386 B2 | 12/2010 | Hazlehurst et al. | |
| 7,856,453 B2 | 12/2010 | Malik et al. | |
| 7,870,066 B2 | 1/2011 | Lin et al. | |
| 7,870,068 B2 | 1/2011 | Chin | |
| 7,870,078 B2 | 1/2011 | Clark et al. | |
| 7,873,573 B2 | 1/2011 | Realini | |
| 7,877,304 B1 | 1/2011 | Coulter | |
| 7,877,784 B2 | 1/2011 | Chow et al. | |
| 7,880,728 B2 | 2/2011 | de los Reyes et al. | |
| 7,890,403 B1 | 2/2011 | Smith | |
| 7,899,750 B1 | 3/2011 | Klieman et al. | |
| 7,908,242 B1 | 3/2011 | Achanta | |
| 7,909,246 B2 | 3/2011 | Hogg et al. | |
| 7,911,673 B1 | 3/2011 | Yap | |
| 7,912,842 B1 | 3/2011 | Bayliss et al. | |
| 7,912,865 B2 | 3/2011 | Akerman et al. | |
| 7,925,582 B1 | 4/2011 | Kornegay et al. | |
| 7,925,982 B2 | 4/2011 | Parker | |
| 7,930,285 B2 | 4/2011 | Abraham et al. | |
| 7,933,834 B2 | 4/2011 | Kumar et al. | |
| 7,937,325 B2 | 5/2011 | Kumar et al. | |
| 7,954,698 B1 | 6/2011 | Pliha | |
| 7,958,046 B2 | 6/2011 | Doerner et al. | |
| 7,966,192 B2 | 6/2011 | Pagliari et al. | |
| 7,966,325 B2 * | 6/2011 | Singh | G06F 16/951 707/732 |
| 7,970,676 B2 | 6/2011 | Feinstein | |
| 7,970,679 B2 | 6/2011 | Kasower | |
| 7,970,698 B2 | 6/2011 | Gupta et al. | |
| 7,970,701 B2 | 6/2011 | Lewis et al. | |
| 7,975,299 B1 | 7/2011 | Balducci et al. | |
| 7,979,908 B2 | 7/2011 | Millwee | |
| 7,983,932 B2 | 7/2011 | Kane | |
| 7,987,501 B2 | 7/2011 | Miller et al. | |
| 7,990,895 B2 | 8/2011 | Ferguson et al. | |
| 7,991,688 B2 | 8/2011 | Phelan et al. | |
| 8,001,153 B2 | 8/2011 | Skurtovich, Jr. et al. | |
| 8,001,235 B2 | 8/2011 | Russ et al. | |
| 8,006,261 B1 | 8/2011 | Haberman et al. | |
| 8,015,107 B2 | 9/2011 | Kornegay et al. | |
| 8,032,932 B2 | 10/2011 | Speyer et al. | |
| 8,036,941 B2 | 10/2011 | Bennett et al. | |
| 8,037,097 B2 | 10/2011 | Guo et al. | |

(56) References Cited

U.S. PATENT DOCUMENTS

| | | |
|---|---|---|
| 8,055,904 B1 | 11/2011 | Cato et al. |
| 8,060,424 B2 | 11/2011 | Kasower |
| 8,060,438 B2 | 11/2011 | Dhar et al. |
| 8,060,916 B2 | 11/2011 | Bajaj et al. |
| 8,065,233 B2 | 11/2011 | Lee et al. |
| 8,069,407 B1 | 11/2011 | Armandpour et al. |
| 8,078,453 B2 | 12/2011 | Shaw |
| 8,078,516 B1 | 12/2011 | Weiss et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,099,356 B2 | 1/2012 | Feinstein et al. |
| 8,099,376 B2 | 1/2012 | Serrano-Morales et al. |
| 8,103,587 B2 | 1/2012 | Kumar et al. |
| 8,104,671 B2 | 1/2012 | Besecker et al. |
| 8,104,679 B2 | 1/2012 | Brown |
| 8,108,301 B2 | 1/2012 | Gupta et al. |
| 8,126,456 B2 | 2/2012 | Lotter et al. |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,131,777 B2 | 3/2012 | McCullouch |
| 8,145,554 B2 | 3/2012 | Kumar et al. |
| 8,160,960 B1 | 4/2012 | Fei et al. |
| 8,175,889 B1 | 5/2012 | Girulat et al. |
| 8,195,549 B2 | 6/2012 | Kasower |
| 8,201,257 B1 | 6/2012 | Andres et al. |
| 8,204,812 B2 | 6/2012 | Stewart et al. |
| 8,219,771 B2 | 7/2012 | Le Neel |
| 8,224,723 B2 | 7/2012 | Bosch et al. |
| 8,224,747 B2 | 7/2012 | Kumar et al. |
| 8,225,395 B2 | 7/2012 | Atwood et al. |
| 8,229,911 B2 * | 7/2012 | Bennett ............... G06F 16/9535 707/706 |
| 8,234,498 B2 | 7/2012 | Britti et al. |
| 8,244,848 B2 | 8/2012 | Narayanan et al. |
| 8,249,968 B1 | 8/2012 | Oldham et al. |
| 8,261,974 B2 | 9/2012 | Hull |
| 8,271,362 B2 | 9/2012 | Fasching |
| 8,271,393 B2 | 9/2012 | Twining et al. |
| 8,281,372 B1 | 10/2012 | Vidal |
| 8,285,613 B1 | 10/2012 | Coulter |
| 8,285,640 B2 | 10/2012 | Scipioni |
| 8,285,641 B2 | 10/2012 | Cataline et al. |
| 8,285,656 B1 | 10/2012 | Chang et al. |
| 8,290,840 B2 | 10/2012 | Kasower |
| 8,290,856 B1 | 10/2012 | Kasower |
| 8,296,229 B1 | 10/2012 | Yellin et al. |
| 8,312,033 B1 | 11/2012 | McMillan |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,346,615 B2 | 1/2013 | Connors et al. |
| 8,355,967 B2 | 1/2013 | Debie et al. |
| 8,374,973 B2 | 2/2013 | Herbrich et al. |
| 8,407,141 B2 | 3/2013 | Mullen et al. |
| 8,407,194 B1 | 3/2013 | Chaput et al. |
| 8,412,593 B1 | 4/2013 | Song et al. |
| 8,417,644 B2 | 4/2013 | Ferguson et al. |
| 8,423,285 B2 * | 4/2013 | Paterson ............... G01C 21/20 701/300 |
| 8,429,073 B2 | 4/2013 | Ferguson et al. |
| 8,433,654 B2 | 4/2013 | Subbarao et al. |
| 8,443,202 B2 | 5/2013 | White et al. |
| 8,456,293 B1 | 6/2013 | Trundle et al. |
| 8,458,062 B2 | 6/2013 | Dutt et al. |
| 8,463,939 B1 | 6/2013 | Galvin |
| 8,464,939 B1 * | 6/2013 | Taylor ................ G06Q 20/4016 235/380 |
| 8,473,318 B2 | 6/2013 | Nielson et al. |
| 8,478,674 B1 | 7/2013 | Kapczynski et al. |
| 8,484,186 B1 | 7/2013 | Kapczynski et al. |
| 8,498,914 B2 | 7/2013 | Hazelhurst |
| 8,499,348 B1 | 7/2013 | Rubin |
| 8,504,470 B1 | 8/2013 | Chirehdast |
| 8,515,828 B1 | 8/2013 | Wolf et al. |
| 8,515,844 B2 | 8/2013 | Kasower |
| 8,527,357 B1 | 9/2013 | Ganesan |
| 8,527,596 B2 | 9/2013 | Long et al. |
| 8,533,118 B2 | 9/2013 | Weller et al. |
| 8,555,357 B1 | 10/2013 | Gauvin |
| 8,560,436 B2 | 10/2013 | Ingram et al. |
| 8,560,444 B2 | 10/2013 | Rosenblatt et al. |
| 8,560,447 B1 | 10/2013 | Hinghole et al. |
| 8,572,083 B1 | 10/2013 | Snell et al. |
| 8,578,036 B1 | 11/2013 | Holfelder et al. |
| 8,578,496 B1 | 11/2013 | Krishnappa |
| 8,600,886 B2 | 12/2013 | Ramavarjula et al. |
| 8,601,602 B1 | 12/2013 | Zheng |
| 8,606,694 B2 | 12/2013 | Campbell et al. |
| 8,630,938 B2 | 1/2014 | Cheng et al. |
| 8,646,051 B2 | 2/2014 | Paden et al. |
| 8,660,919 B2 | 2/2014 | Kasower |
| 8,671,115 B2 | 3/2014 | Skurtovich, Jr. et al. |
| 8,688,543 B2 | 4/2014 | Dominquez |
| 8,689,001 B1 | 4/2014 | Satish |
| 8,694,420 B1 | 4/2014 | Oliai |
| 8,705,718 B2 | 4/2014 | Baniak et al. |
| 8,706,599 B1 | 4/2014 | Koenig et al. |
| 8,725,613 B1 | 5/2014 | Celka et al. |
| 8,738,516 B1 | 5/2014 | Dean et al. |
| 8,745,698 B1 | 6/2014 | Ashfield et al. |
| 8,751,378 B2 | 6/2014 | Dornhelm et al. |
| 8,768,914 B2 | 7/2014 | Scriffignano et al. |
| 8,781,951 B2 | 7/2014 | Lewis et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,856,894 B1 | 10/2014 | Dean et al. |
| 8,856,945 B2 | 10/2014 | Carter et al. |
| 8,860,763 B2 | 10/2014 | Privault et al. |
| 8,868,914 B2 | 10/2014 | Teppler |
| 8,930,251 B2 | 1/2015 | DeBie |
| 8,930,263 B1 | 1/2015 | Mahacek et al. |
| 8,938,399 B1 | 1/2015 | Herman |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,002,753 B2 | 4/2015 | Anschutz et al. |
| 9,058,627 B1 | 6/2015 | Wasser et al. |
| 9,106,691 B1 | 8/2015 | Burger et al. |
| 9,147,042 B1 | 9/2015 | Haller et al. |
| 9,218,481 B2 | 10/2015 | Belisario |
| 9,183,377 B1 | 11/2015 | Sobel et al. |
| 9,225,704 B1 | 12/2015 | Johansson et al. |
| 9,230,283 B1 | 1/2016 | Taylor et al. |
| 9,256,624 B2 | 2/2016 | Skurtovich, Jr. et al. |
| 9,256,904 B1 | 2/2016 | Haller et al. |
| 9,400,589 B1 | 7/2016 | Wasser et al. |
| 9,406,085 B1 | 8/2016 | Hunt, III et al. |
| 9,443,268 B1 | 9/2016 | Kapczynski et al. |
| 9,477,737 B1 | 10/2016 | Charyk et al. |
| 9,483,606 B1 | 11/2016 | Dean et al. |
| 9,501,583 B2 * | 11/2016 | Nordstrom ........ G06F 17/3053 |
| 9,536,263 B1 | 1/2017 | Dean et al. |
| 9,542,553 B1 | 1/2017 | Burger et al. |
| 9,542,682 B1 | 1/2017 | Taylor et al. |
| 9,563,916 B1 * | 2/2017 | Torrez ................ G06Q 10/04 |
| 9,619,751 B2 | 4/2017 | Woon et al. |
| 9,654,541 B1 | 5/2017 | Kapczynski et al. |
| 9,665,854 B1 | 5/2017 | Burger et al. |
| 9,697,568 B1 | 7/2017 | Hunt, III |
| 9,710,523 B2 | 7/2017 | Skurtovich, Jr. et al. |
| 9,710,852 B1 | 7/2017 | Olson et al. |
| 9,767,513 B1 | 9/2017 | Taylor et al. |
| 9,830,646 B1 | 11/2017 | Wasser et al. |
| 9,853,959 B1 | 12/2017 | Kapczynski et al. |
| 9,870,589 B1 | 1/2018 | Arnold et al. |
| 9,892,457 B1 | 2/2018 | Kapczynski |

(56) References Cited

U.S. PATENT DOCUMENTS

| | | |
|---|---|---|
| 9,916,621 B1 | 3/2018 | Wasser et al. |
| 9,972,048 B1 | 5/2018 | Dean et al. |
| 9,990,674 B1 | 6/2018 | Taylor et al. |
| 10,025,842 B1 | 7/2018 | Charyk et al. |
| 10,043,214 B1 | 8/2018 | Hunt, III |
| 10,061,936 B1 | 8/2018 | Burger et al. |
| 10,075,446 B2 | 9/2018 | McMillan et al. |
| 10,102,570 B1 | 10/2018 | Kapczynski et al. |
| 10,176,233 B1 | 1/2019 | Dean et al. |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0032181 A1 | 10/2001 | Jakstadt et al. |
| 2001/0034631 A1 | 10/2001 | Kiselik |
| 2001/0037204 A1 | 11/2001 | Horn et al. |
| 2001/0037289 A1 | 11/2001 | Mayr et al. |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0044764 A1 | 11/2001 | Arnold |
| 2001/0047332 A1 | 11/2001 | Gonen-Friedman et al. |
| 2001/0049274 A1 | 12/2001 | Degraeve |
| 2002/0010616 A1 | 1/2002 | Itzaki |
| 2002/0010635 A1 | 1/2002 | Tokiwa |
| 2002/0013827 A1 | 1/2002 | Edstrom et al. |
| 2002/0013899 A1 | 1/2002 | Faul |
| 2002/0029192 A1 | 3/2002 | Nakagawa et al. |
| 2002/0032635 A1 | 3/2002 | Harris et al. |
| 2002/0033846 A1 | 3/2002 | Balasubramanian et al. |
| 2002/0035480 A1 | 3/2002 | Gordon et al. |
| 2002/0035520 A1 | 3/2002 | Weiss |
| 2002/0045154 A1 | 4/2002 | Wood et al. |
| 2002/0049624 A1 | 4/2002 | Raveis, Jr. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0062249 A1 | 5/2002 | Iannacci |
| 2002/0069122 A1 | 6/2002 | Yun et al. |
| 2002/0069182 A1 | 6/2002 | Dwyer |
| 2002/0072927 A1 | 6/2002 | Phelan et al. |
| 2002/0073017 A1 | 6/2002 | Robertson |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0116331 A1 | 8/2002 | Cataline et al. |
| 2002/0120537 A1 | 8/2002 | Morea et al. |
| 2002/0120757 A1 | 8/2002 | Sutherland et al. |
| 2002/0120846 A1 | 8/2002 | Stewart et al. |
| 2002/0128917 A1 | 9/2002 | Grounds |
| 2002/0128962 A1 | 9/2002 | Kasower |
| 2002/0133365 A1 | 9/2002 | Grey et al. |
| 2002/0133462 A1 | 9/2002 | Shteyn |
| 2002/0133504 A1 | 9/2002 | Vlahos et al. |
| 2002/0138409 A1 | 9/2002 | Bass |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0174048 A1 | 11/2002 | Dheer et al. |
| 2002/0174061 A1 | 11/2002 | Srinivasan et al. |
| 2002/0194120 A1 | 12/2002 | Russell et al. |
| 2002/0194140 A1 | 12/2002 | Makuck |
| 2002/0198800 A1 | 12/2002 | Shamrakov |
| 2002/0198806 A1 | 12/2002 | Blagg et al. |
| 2002/0198822 A1 | 12/2002 | Munoz et al. |
| 2002/0198824 A1 | 12/2002 | Cook |
| 2002/0198830 A1 | 12/2002 | Randell et al. |
| 2003/0002671 A1 | 1/2003 | Inchalik et al. |
| 2003/0004853 A1 | 1/2003 | Ram et al. |
| 2003/0004855 A1 | 1/2003 | Dutta et al. |
| 2003/0007283 A1 | 1/2003 | Ostwald et al. |
| 2003/0009411 A1 | 1/2003 | Ram et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0023531 A1 | 1/2003 | Fergusson |
| 2003/0028466 A1 | 2/2003 | Jenson et al. |
| 2003/0028477 A1 | 2/2003 | Stevenson et al. |
| 2003/0028529 A1 | 2/2003 | Cheung |
| 2003/0036995 A1 | 2/2003 | Lazerson |
| 2003/0046311 A1 | 3/2003 | Baidya et al. |
| 2003/0050929 A1 | 3/2003 | Bookman et al. |
| 2003/0061104 A1 | 3/2003 | Thomson et al. |
| 2003/0061155 A1 | 3/2003 | Chin |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0078897 A1 | 4/2003 | Florance et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105646 A1 | 6/2003 | Siepser |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0154162 A1 | 8/2003 | Danaher et al. |
| 2003/0158960 A1 | 8/2003 | Engberg |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0187768 A1 | 10/2003 | Ryan et al. |
| 2003/0187837 A1 | 10/2003 | Culliss |
| 2003/0191711 A1 | 10/2003 | Jamison et al. |
| 2003/0191731 A1 | 10/2003 | Stewart et al. |
| 2003/0195859 A1 | 10/2003 | Lawrence |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212909 A1 | 11/2003 | Chandrashekhar |
| 2003/0214775 A1 | 11/2003 | Fukuta et al. |
| 2003/0219709 A1 | 11/2003 | Olenick et al. |
| 2003/0220858 A1 | 11/2003 | Lam et al. |
| 2003/0225742 A1 | 12/2003 | Tenner et al. |
| 2003/0229580 A1 | 12/2003 | Gass et al. |
| 2004/0001565 A1 | 1/2004 | Jones et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024709 A1 | 2/2004 | Yu et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0046033 A1 | 3/2004 | Kolodziej et al. |
| 2004/0062213 A1 | 4/2004 | Koss |
| 2004/0083159 A1 | 4/2004 | Crosby et al. |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |
| 2004/0098418 A1 | 5/2004 | Hein |

(56) References Cited

U.S. PATENT DOCUMENTS

| | | |
|---|---|---|
| 2004/0098546 A1 | 5/2004 | Bashant et al. |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0133440 A1 | 7/2004 | Carolan et al. |
| 2004/0133493 A1 | 7/2004 | Ford et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0172360 A1 | 9/2004 | Mabrey et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0199456 A1 * | 10/2004 | Flint ..................... G06Q 30/02 705/38 |
| 2004/0199789 A1 | 10/2004 | Shaw et al. |
| 2004/0210661 A1 | 10/2004 | Thompson |
| 2004/0215673 A1 | 10/2004 | Furukawa et al. |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1 | 11/2004 | Greene |
| 2004/0225643 A1 | 11/2004 | Alpha et al. |
| 2004/0230527 A1 | 11/2004 | Hansen et al. |
| 2004/0236688 A1 | 11/2004 | Bozeman |
| 2004/0243450 A1 | 12/2004 | Bernard, Jr. et al. |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0010513 A1 | 1/2005 | Duckworth et al. |
| 2005/0015273 A1 | 1/2005 | Iyer |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027983 A1 | 2/2005 | Klawon |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0080723 A1 | 4/2005 | Burchetta et al. |
| 2005/0080796 A1 | 4/2005 | Midgley |
| 2005/0086126 A1 | 4/2005 | Patterson |
| 2005/0086261 A1 | 4/2005 | Mammone |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144143 A1 | 6/2005 | Freiberg |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0160051 A1 | 7/2005 | Johnson |
| 2005/0160280 A1 | 7/2005 | Caslin et al. |
| 2005/0171884 A1 | 8/2005 | Arnott |
| 2005/0203768 A1 | 9/2005 | Florance |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0251474 A1 | 11/2005 | Shinn et al. |
| 2005/0267840 A1 | 12/2005 | Holm-Blagg et al. |
| 2005/0273431 A1 | 12/2005 | Abel et al. |
| 2005/0283415 A1 | 12/2005 | Studnitzer et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0031158 A1 | 2/2006 | Orman |
| 2006/0031177 A1 | 2/2006 | Rule |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041670 A1 | 2/2006 | Musseleck et al. |
| 2006/0047605 A1 | 3/2006 | Ahmad |
| 2006/0059083 A1 | 3/2006 | Friesen et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080235 A1 | 4/2006 | Fukuda et al. |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0129419 A1 | 6/2006 | Flaxer et al. |
| 2006/0129472 A1 | 6/2006 | Harrington |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136524 A1 | 6/2006 | Wohlers et al. |
| 2006/0136595 A1 | 6/2006 | Satyavolu |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190394 A1 | 8/2006 | Fraser et al. |
| 2006/0195351 A1 | 8/2006 | Bayburtian |
| 2006/0200583 A1 | 9/2006 | Le Lann et al. |
| 2006/0202012 A1 | 9/2006 | Grano et al. |
| 2006/0212407 A1 | 9/2006 | Lyon |
| 2006/0212486 A1 | 9/2006 | Kennis et al. |
| 2006/0218407 A1 | 9/2006 | Toms |
| 2006/0223043 A1 | 10/2006 | Dancy-Edwards et al. |
| 2006/0224498 A1 | 10/2006 | Chin |

(56) References Cited

U.S. PATENT DOCUMENTS

| | | |
|---|---|---|
| 2006/0229943 A1 | 10/2006 | Mathias et al. |
| 2006/0229961 A1 | 10/2006 | Lyftogt et al. |
| 2006/0235935 A1 | 10/2006 | Ng |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0282886 A1 | 12/2006 | Gaug |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0016500 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0039049 A1 | 2/2007 | Kupferman et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0050777 A1 | 3/2007 | Hutchinson et al. |
| 2007/0055621 A1 | 3/2007 | Tischler et al. |
| 2007/0057947 A1 | 3/2007 | Yokoyama |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094230 A1 | 4/2007 | Subramaniam et al. |
| 2007/0094241 A1 | 4/2007 | Blackwell et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0136109 A1 | 6/2007 | Yager et al. |
| 2007/0143123 A1 | 6/2007 | Goldberg et al. |
| 2007/0149184 A1 | 6/2007 | Viegers et al. |
| 2007/0156554 A1 | 7/2007 | Nikoley et al. |
| 2007/0156581 A1 | 7/2007 | Imrey et al. |
| 2007/0156692 A1 | 7/2007 | Rosewarne |
| 2007/0157107 A1 | 7/2007 | Bishop |
| 2007/0160458 A1 | 7/2007 | Yen |
| 2007/0162458 A1 | 7/2007 | Fasciano |
| 2007/0174186 A1 | 7/2007 | Hokland |
| 2007/0174448 A1 | 7/2007 | Ahuja et al. |
| 2007/0174903 A1 | 7/2007 | Greff |
| 2007/0192167 A1 | 8/2007 | Lei et al. |
| 2007/0198432 A1 | 8/2007 | Pitroda et al. |
| 2007/0204033 A1 | 8/2007 | Bookbinder et al. |
| 2007/0204212 A1 | 8/2007 | Chamberlain et al. |
| 2007/0204338 A1 | 8/2007 | Aiello et al. |
| 2007/0205266 A1 | 9/2007 | Carr et al. |
| 2007/0208640 A1 | 9/2007 | Banasiak et al. |
| 2007/0220003 A1 | 9/2007 | Chern et al. |
| 2007/0226047 A1 | 9/2007 | Ward |
| 2007/0226122 A1 | 9/2007 | Burrell et al. |
| 2007/0233591 A1 | 10/2007 | Newton |
| 2007/0239493 A1 | 10/2007 | Sweetland et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0262140 A1 | 11/2007 | Long, Sr. |
| 2007/0266439 A1 | 11/2007 | Kraft |
| 2007/0273558 A1 | 11/2007 | Smith |
| 2007/0282743 A1 | 12/2007 | Lovelett |
| 2007/0287415 A1 | 12/2007 | Yamada |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0299770 A1 | 12/2007 | Delinsky |
| 2008/0004957 A1 | 1/2008 | Hildreth et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0021802 A1 | 1/2008 | Pendleton |
| 2008/0027859 A1 | 1/2008 | Nathans et al. |
| 2008/0028435 A1 | 1/2008 | Strickland et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040475 A1 | 2/2008 | Bosworth et al. |
| 2008/0040610 A1 | 2/2008 | Fergusson |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059352 A1 | 3/2008 | Chandran |
| 2008/0059364 A1 | 3/2008 | Tidwell et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0097822 A1 | 4/2008 | Schigel et al. |
| 2008/0103800 A1 | 5/2008 | Domenikos et al. |
| 2008/0103972 A1 | 5/2008 | Lanc |
| 2008/0109422 A1 | 5/2008 | Dedhia |
| 2008/0109740 A1 | 5/2008 | Prinsen et al. |
| 2008/0110973 A1 | 5/2008 | Nathans et al. |
| 2008/0114670 A1 | 5/2008 | Friesen |
| 2008/0114855 A1 | 5/2008 | Welingkar et al. |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0133273 A1 | 6/2008 | Marshall |
| 2008/0133278 A1 | 6/2008 | Stanfield |
| 2008/0133657 A1 | 6/2008 | Pennington |
| 2008/0140476 A1 | 6/2008 | Anand et al. |
| 2008/0140576 A1 | 6/2008 | Lewis et al. |
| 2008/0140734 A1 | 6/2008 | Wagner |
| 2008/0141346 A1 | 6/2008 | Kay et al. |
| 2008/0147523 A1 | 6/2008 | Mulry et al. |
| 2008/0148368 A1 | 6/2008 | Zurko et al. |
| 2008/0148392 A1 | 6/2008 | Akens |
| 2008/0154758 A1 | 6/2008 | Schattmaier et al. |
| 2008/0154766 A1 | 6/2008 | Lewis et al. |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183585 A1 | 7/2008 | Vianello |

(56) References Cited

U.S. PATENT DOCUMENTS

| | | |
|---|---|---|
| 2008/0184351 A1 | 7/2008 | Gephart |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208548 A1 | 8/2008 | Metzger et al. |
| 2008/0208735 A1 | 8/2008 | Balet et al. |
| 2008/0212845 A1 | 9/2008 | Lund |
| 2008/0216156 A1 | 9/2008 | Kosaka |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0249869 A1 | 10/2008 | Angell et al. |
| 2008/0255992 A1 | 10/2008 | Lin |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0301016 A1 | 12/2008 | Durvasula et al. |
| 2008/0319889 A1 | 12/2008 | Hammad |
| 2008/0319896 A1 | 12/2008 | Carlson et al. |
| 2009/0006230 A1 | 1/2009 | Lyda et al. |
| 2009/0018986 A1 | 1/2009 | Alcorn et al. |
| 2009/0024484 A1 | 1/2009 | Walker et al. |
| 2009/0030776 A1 | 1/2009 | Walker et al. |
| 2009/0037279 A1 | 2/2009 | Chockalingam et al. |
| 2009/0037332 A1 | 2/2009 | Cheung et al. |
| 2009/0043691 A1 | 2/2009 | Kasower |
| 2009/0048957 A1 | 2/2009 | Celano |
| 2009/0048999 A1 | 2/2009 | Gupta et al. |
| 2009/0055287 A1 | 2/2009 | Chin |
| 2009/0055312 A1 | 2/2009 | Chin |
| 2009/0055322 A1 | 2/2009 | Bykov et al. |
| 2009/0055404 A1 | 2/2009 | Heiden et al. |
| 2009/0064297 A1 | 3/2009 | Selgas et al. |
| 2009/0089190 A1 | 4/2009 | Girulat |
| 2009/0089193 A1 | 4/2009 | Palantin |
| 2009/0089869 A1 | 4/2009 | Varghese |
| 2009/0094237 A1 | 4/2009 | Churi et al. |
| 2009/0094675 A1 | 4/2009 | Powers |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119116 A1 | 5/2009 | Steen |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132347 A1 | 5/2009 | Anderson et al. |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0164582 A1 | 6/2009 | Dasgupta et al. |
| 2009/0164929 A1 | 6/2009 | Chen et al. |
| 2009/0171723 A1 | 7/2009 | Jenkins |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0198557 A1 | 8/2009 | Wang et al. |
| 2009/0198602 A1 | 8/2009 | Wang et al. |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0222449 A1 | 9/2009 | Hom et al. |
| 2009/0222527 A1 | 9/2009 | Arconati et al. |
| 2009/0228295 A1 | 9/2009 | Lowy |
| 2009/0228918 A1 | 9/2009 | Rolff et al. |
| 2009/0228990 A1 | 9/2009 | Chen et al. |
| 2009/0234665 A1 | 9/2009 | Conkel |
| 2009/0234775 A1 | 9/2009 | Whitney et al. |
| 2009/0234814 A1 | 9/2009 | Boerries et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0258334 A1 | 10/2009 | Pyne |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0281816 A1 | 11/2009 | Houga et al. |
| 2009/0289110 A1 | 11/2009 | Regen et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0307778 A1 | 12/2009 | Mardikar |
| 2009/0313562 A1 | 12/2009 | Appleyard et al. |
| 2009/0319648 A1 | 12/2009 | Dutta et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0023506 A1 | 1/2010 | Sahni et al. |
| 2010/0025820 A1 | 2/2010 | Suekawa |
| 2010/0030578 A1 | 2/2010 | Siddique et al. |
| 2010/0030649 A1 | 2/2010 | Ubelhor |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042537 A1 | 2/2010 | Smith et al. |
| 2010/0042542 A1 | 2/2010 | Rose et al. |
| 2010/0043055 A1 | 2/2010 | Baumgart |
| 2010/0049803 A1 | 2/2010 | Ogilvie et al. |
| 2010/0063942 A1 | 3/2010 | Arnott et al. |
| 2010/0063993 A1 | 3/2010 | Higgins et al. |
| 2010/0077483 A1 | 3/2010 | Stolfo et al. |
| 2010/0082445 A1 | 4/2010 | Hodge et al. |
| 2010/0082476 A1 | 4/2010 | Bowman |
| 2010/0083371 A1 | 4/2010 | Bennetts et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0153278 A1 | 6/2010 | Farsedakis |
| 2010/0153290 A1 | 6/2010 | Duggan |
| 2010/0161816 A1 | 6/2010 | Kraft et al. |

(56) References Cited

U.S. PATENT DOCUMENTS

| | | |
|---|---|---|
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0214090 A1 | 8/2010 | Sartini et al. |
| 2010/0217837 A1 | 8/2010 | Ansari et al. |
| 2010/0223160 A1 | 9/2010 | Brown |
| 2010/0223184 A1 | 9/2010 | Perlman |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257577 A1 | 10/2010 | Grandison et al. |
| 2010/0258623 A1 | 10/2010 | Beemer et al. |
| 2010/0262606 A1 | 10/2010 | Bedolla et al. |
| 2010/0262932 A1 | 10/2010 | Pan |
| 2010/0268557 A1 | 10/2010 | Faith et al. |
| 2010/0274815 A1 | 10/2010 | Vanasco |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0306834 A1 | 12/2010 | Grandison et al. |
| 2010/0312691 A1 | 12/2010 | Johnson, Jr. |
| 2010/0323446 A1 | 12/2010 | Barnett et al. |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0023115 A1 | 1/2011 | Wright |
| 2011/0029388 A1 | 2/2011 | Kendall et al. |
| 2011/0029566 A1 | 2/2011 | Grandison et al. |
| 2011/0035305 A1 | 2/2011 | Imrey et al. |
| 2011/0035315 A1 | 2/2011 | Langley |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0047606 A1 | 2/2011 | Blomquist |
| 2011/0066495 A1 | 3/2011 | Ayloo et al. |
| 2011/0066618 A1 | 3/2011 | Sigurbjornsson et al. |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0107400 A1 | 5/2011 | Shankaranarayanan et al. |
| 2011/0113084 A1 | 5/2011 | Ramnani |
| 2011/0113086 A1 | 5/2011 | Long et al. |
| 2011/0113096 A1 | 5/2011 | Long et al. |
| 2011/0119169 A1 | 5/2011 | Passero et al. |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137765 A1 | 6/2011 | Nonaka |
| 2011/0142213 A1 | 6/2011 | Baniak et al. |
| 2011/0143711 A1 | 6/2011 | Hirson et al. |
| 2011/0145899 A1 | 6/2011 | Cao et al. |
| 2011/0148625 A1 | 6/2011 | Velusamy |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0178899 A1 | 7/2011 | Huszar |
| 2011/0179139 A1 | 7/2011 | Starkenburg et al. |
| 2011/0184780 A1 | 7/2011 | Alderson et al. |
| 2011/0193704 A1 | 8/2011 | Harper et al. |
| 2011/0196791 A1 | 8/2011 | Dominguez |
| 2011/0211445 A1 | 9/2011 | Chen |
| 2011/0214187 A1 | 9/2011 | Wittenstein et al. |
| 2011/0252071 A1 | 10/2011 | Cidon |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270754 A1 | 11/2011 | Kelly et al. |
| 2011/0276396 A1 | 11/2011 | Rathod |
| 2011/0296003 A1 | 12/2011 | McCann et al. |
| 2011/0302653 A1 | 12/2011 | Frantz et al. |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2011/0320582 A1 | 12/2011 | Lewis |
| 2012/0005070 A1 | 1/2012 | McFall et al. |
| 2012/0005542 A1 | 1/2012 | Petersen et al. |
| 2012/0011158 A1 | 1/2012 | Avner et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0036065 A1 | 2/2012 | Orttung et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066044 A1 | 3/2012 | Honnef et al. |
| 2012/0066106 A1 | 3/2012 | Papadimitriou |
| 2012/0072382 A1 | 3/2012 | Pearson et al. |
| 2012/0084866 A1 | 4/2012 | Stolfo |
| 2012/0089438 A1 | 4/2012 | Tavares et al. |
| 2012/0101938 A1 | 4/2012 | Kasower |
| 2012/0101939 A1 | 4/2012 | Kasower |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0144461 A1 | 6/2012 | Rathbun |
| 2012/0151045 A1 | 6/2012 | Anakata et al. |
| 2012/0151046 A1 | 6/2012 | Weiss et al. |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0185515 A1 | 7/2012 | Ferrel et al. |
| 2012/0195412 A1 | 8/2012 | Smith |
| 2012/0198556 A1 | 8/2012 | Patel et al. |
| 2012/0215682 A1 | 8/2012 | Lent et al. |
| 2012/0215719 A1 | 8/2012 | Verlander |
| 2012/0216125 A1 | 8/2012 | Pierce |
| 2012/0221467 A1 | 8/2012 | Hamzeh |
| 2012/0235897 A1 | 9/2012 | Hirota |
| 2012/0239417 A1 | 9/2012 | Pourfallah et al. |
| 2012/0239497 A1 | 9/2012 | Nuzzi |
| 2012/0246060 A1 | 9/2012 | Conyack, Jr. et al. |
| 2012/0253852 A1 | 10/2012 | Pourfallah et al. |
| 2012/0262472 A1 | 10/2012 | Garr et al. |
| 2012/0271712 A1 | 10/2012 | Katzin et al. |
| 2012/0278217 A1 | 11/2012 | Sui et al. |
| 2012/0278226 A1 | 11/2012 | Kolo |
| 2012/0278767 A1 | 11/2012 | Stibel et al. |
| 2012/0290660 A1 | 11/2012 | Rao et al. |
| 2012/0290740 A1 | 11/2012 | Tewari et al. |
| 2012/0297484 A1 | 11/2012 | Srivastava |
| 2012/0317013 A1 | 12/2012 | Luk et al. |
| 2012/0317014 A1 | 12/2012 | Cerise et al. |
| 2012/0324388 A1 | 12/2012 | Rao et al. |
| 2013/0006843 A1 | 1/2013 | Tralvex |
| 2013/0006844 A1 | 1/2013 | Kremen |
| 2013/0018798 A1 | 1/2013 | Scipioni |
| 2013/0018811 A1 | 1/2013 | Britti et al. |
| 2013/0024238 A1 | 1/2013 | Nielson et al. |
| 2013/0031109 A1 | 1/2013 | Roulson et al. |
| 2013/0031624 A1 | 1/2013 | Britti et al. |
| 2013/0041798 A1 | 2/2013 | Unger |
| 2013/0041810 A1 | 2/2013 | Murrell et al. |
| 2013/0054357 A1 | 2/2013 | Mager et al. |
| 2013/0066775 A1 | 3/2013 | Milam |

(56) References Cited

U.S. PATENT DOCUMENTS

| | | |
|---|---|---|
| 2013/0073366 A1 | 3/2013 | Heath |
| 2013/0080467 A1 | 3/2013 | Carson et al. |
| 2013/0085804 A1 | 4/2013 | Leff et al. |
| 2013/0085894 A1 | 4/2013 | Chan et al. |
| 2013/0090982 A1 | 4/2013 | Ross |
| 2013/0103464 A1 | 4/2013 | Kuznetsov |
| 2013/0103571 A1 | 4/2013 | Chung et al. |
| 2013/0110557 A1 | 5/2013 | Kasower |
| 2013/0110565 A1 | 5/2013 | Means et al. |
| 2013/0117072 A1 | 5/2013 | Nish |
| 2013/0117087 A1 | 5/2013 | Coppinger |
| 2013/0125010 A1 | 5/2013 | Strandell |
| 2013/0132151 A1 | 5/2013 | Stibel et al. |
| 2013/0159411 A1 | 6/2013 | Bowen |
| 2013/0173447 A1 | 7/2013 | Rothschild |
| 2013/0173449 A1 | 7/2013 | Ng et al. |
| 2013/0173451 A1 | 7/2013 | Kornegay et al. |
| 2013/0185210 A1 | 7/2013 | Dodson et al. |
| 2013/0185293 A1 | 7/2013 | Boback |
| 2013/0187923 A1 | 7/2013 | Yoshimoto et al. |
| 2013/0204762 A1 | 8/2013 | Harris et al. |
| 2013/0205135 A1 | 8/2013 | Lutz |
| 2013/0211986 A1 | 8/2013 | Debie et al. |
| 2013/0262226 A1 | 10/2013 | LaChapelle et al. |
| 2013/0267171 A1 | 10/2013 | Sarkar et al. |
| 2013/0278515 A1 | 10/2013 | Kikuchi |
| 2013/0279676 A1 | 10/2013 | Baniak et al. |
| 2013/0293363 A1 | 11/2013 | Plymouth |
| 2013/0297499 A1 | 11/2013 | Mukherjee |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0019348 A1 | 1/2014 | Daley |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0061302 A1 | 3/2014 | Hammad |
| 2014/0074689 A1 | 3/2014 | Lund et al. |
| 2014/0089166 A1 | 3/2014 | Padawer |
| 2014/0089167 A1 | 3/2014 | Kasower |
| 2014/0089191 A1 | 3/2014 | Brown |
| 2014/0096249 A1 | 4/2014 | Dupont et al. |
| 2014/0098229 A1 | 4/2014 | Lu et al. |
| 2014/0110477 A1 | 4/2014 | Hammad |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0180919 A1 | 6/2014 | Brown |
| 2014/0181285 A1 | 6/2014 | Stevens et al. |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0279382 A1 | 9/2014 | Drakeley et al. |
| 2014/0279391 A1 | 9/2014 | Gallo et al. |
| 2014/0298485 A1 | 10/2014 | Gardner |
| 2014/0310151 A1 | 10/2014 | Shishkov et al. |
| 2014/0317023 A1 | 10/2014 | Kim |
| 2014/0379554 A1 | 12/2014 | Grossman et al. |
| 2015/0026060 A1 | 1/2015 | Krietzman et al. |
| 2015/0127490 A1 | 5/2015 | Puertas |
| 2015/0134506 A1 | 5/2015 | King et al. |
| 2015/0178829 A1 | 6/2015 | Weiss |
| 2015/0310543 A1 | 10/2015 | DeBie |
| 2015/0324920 A1 | 11/2015 | Wilson et al. |
| 2015/0326580 A1 | 11/2015 | McMillan et al. |
| 2015/0379407 A1 | 12/2015 | Woon et al. |
| 2017/0132700 A1 | 5/2017 | Kazerani et al. |
| 2017/0200223 A1 | 7/2017 | Kasower |
| 2018/0225756 A1 | 8/2018 | Wasser et al. |
| 2018/0276747 A1 | 9/2018 | Taylor et al. |
| 2018/0343265 A1 | 11/2018 | McMillan et al. |
| 2018/0349992 A1 | 12/2018 | Dean et al. |
| 2018/0365445 A1 | 12/2018 | Burger et al. |

FOREIGN PATENT DOCUMENTS

| | | |
|---|---|---|
| EP | 1 239 378 | 9/2002 |
| EP | 1 301 887 | 4/2003 |
| EP | 1 591 931 | 11/2005 |
| EP | 1 850 278 | 10/2007 |
| EP | 2 088 743 | 8/2009 |
| EP | 2 151 793 | 2/2010 |
| GB | 2 102 606 | 2/1983 |
| JP | 2005-208945 | 8/2005 |
| KR | 10-2000-0063313 | 11/2000 |
| KR | 10-2002-0039203 | 5/2002 |
| KR | 10-2007-0081504 | 8/2007 |
| TW | 256569 | 6/2006 |
| WO | WO 91/16691 | 10/1991 |
| WO | WO 00/051052 | 8/2000 |
| WO | WO 00/055778 | 9/2000 |
| WO | WO 01/009752 | 2/2001 |
| WO | WO 01/009792 | 2/2001 |
| WO | WO 01/084281 | 11/2001 |
| WO | WO 02/029636 | 4/2002 |
| WO | WO 2004/031986 | 4/2004 |
| WO | WO 2005/010683 | 2/2005 |
| WO | WO 2005/033972 | 4/2005 |
| WO | WO 2006/050278 | 5/2006 |
| WO | WO 2006/069199 | 6/2006 |
| WO | WO 2007/084555 | 7/2007 |
| WO | WO 2008/021104 | 2/2008 |
| WO | WO 2008/042614 | 4/2008 |
| WO | WO 2009/064694 | 5/2009 |
| WO | WO 2009/064840 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |

OTHER PUBLICATIONS

U.S. Appl. No. 12/705,489, filed Feb. 12, 2010, Bargoli et al.

U.S. Appl. No. 12/705,511, filed Feb. 12, 2010, Bargoli et al.

Actuate, "Delivering Enterprise Information for Corporate Portals", White Paper, 2004, pp. 1-7.

"Aggregate and Analyze Social Media Content: Gain Faster and Broader Insight to Market Sentiment," SAP Partner, Mantis Technology Group, Apr. 2011, pp. 4.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.

ABC News Now:Money Matters, as broadcasted Nov. 15, 2005 with guest Todd Davis (CEO of Lifelock), pp. 6.

Anonymous, "Credit-Report Disputes Await Electronic Resolution," Credit Card News, Chicago, Jan. 15, 1993, vol. 5, No. 19, p. 5.

Anonymous, "MBNA Offers Resolution of Credit Card Disputes," Hempstead, Feb. 2002, vol. 68, No. 2, p. 47.

Anonymous, "Feedback", Credit Management, ABI/INFORM Global, Sep. 2006, pp. 6.

Application as filed in U.S. Appl. No. 09/411,683, dated Oct. 4, 1999.

(56) References Cited

OTHER PUBLICATIONS

Awoonor-Williams, Princess Josephine, Ph.D. "Gender and Credit: An Analysis of Women's Experience in the Credit Market", ProQuest Dissertations and Theses, 2004, pp. 148.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Collins, Michael J., "Exploring the Design of Financial Counseling for Mortgage Borrowers in Default," Journal of Family and Economic Issues, Springer Science+Business Media, Mar. 13, 2007, pp. 207-226.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830.
Elliehausen et al., The Impact of Credit Counseling on Subsequent Borrower Behavior, The Journal of Consumer Affairs, Summer 2007, vol. 41, No. 1, pp. 1-28.

Equifax, "Business Status Alerts: User Guide", Jul. 2009, pp. 1-21.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
"Equifax: Debt Wise™ Credit Monitoring Service," Product Review, http://www.mdmproofing.com/iym/reviews/equifax/debt-wise/, Jan. 2010, pp. 11.
Equifax; "Places", http://web.archive.org/web/20111111113930/http://www.equifax.com/places as archived Nov. 11, 2011 in 1 page.
Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_to_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire,

(56) References Cited

OTHER PUBLICATIONS

New York, Jun. 13, 2005 http://proquest.umi.com/pqdweb?did=852869731&sid=1&Fmt=3&clientId=19649&RQT=309&Vname=PQD.

Ideon, Credit-Card Registry that Bellyflopped this Year, Is Drawing some Bottom-Fishers, The Wall Street Journal, Aug. 21, 1995, pp. C2.

Information Brokers of America, "Information Brokers of America Child Identity Theft Protection" http://web.archive.org/web/20080706135451/http://iboainfo.com/child-order.html as archived Jul. 6, 2008 in 1 page.

Information Brokers of America, "Safeguard Your Child's Credit", http://web.archive.org/web/20071215210406/http://www.iboainfo.com/child-id-protect.html as archived Dec. 15, 2007 in 1 page.

Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.

Iovation, Device Identification & Device Fingerprinting, http://www.iovation.com/risk-management/device-identification printed Nov. 5, 2012 in 6 pages.

Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.

"Judging Credit: Consumers Need Better Finance Tools", News Journal, Daytona Beach, FL, Dec. 28, 2002.

Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.

Lan, Joe, "The Top Portfolio Management Software," http://www.aaii.com/computerizedinvesting/article/the-top-portfolio-management-software, Includes Discussion thread, Fourth Quarter 2011, pp. 17.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Lauwers et al., "Five Hundred Years of Bookkeeping: A Portrait of Luca Pacioli", Tijdschrift voor Economie en Management, 1994, vol. 39. No. 3, pp. 289-304.

Lee, W.A.; "Experian, on Deal Hunt, Nets Identity Theft Insurer", American Banker: The Financial Services Daily, Jun. 4, 2003, New York, NY, 1 page.

Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.

Letter to Donald A. Robert from Carolyn B. Maloney, dated Oct. 31, 2007, pp. 2.

Letter to Donald A. Robert from Senator Charles E. Schumer, dated Oct. 11, 2007, pp. 2.

Letter to Harry C. Gambill from Carolyn B. Maloney, dated Oct. 31, 2007, pp. 2.

Letter to Harry C. Gambill from Senator Charles E. Schumer, dated Oct. 11, 2007, pp. 2.

Letter to Richard F. Smith from Carolyn B. Maloney, dated Oct. 31, 2007, pp. 2.

Letter to Richard F. Smith from Senator Charles E. Schumer, dated Oct. 11, 2007, pp. 2.

Li et al., "Automatic Verbal Information Verification for User Authentication", IEEE Transactions on Speech and Audio Processing, vol. 8, No. 5, Sep. 2000, pp. 585-596.

LifeLock, http://web.archive.org/web/20110724011010/http://www.lifelock.com/? as archived Jul. 24, 2011 in 1 page.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, Various Pages, www.lifelock.com/, 2007.

Littwin, Angela, "Beyond Usury: A Study of Credit-Card Use and Preference Among Low-Income Consumers", Texas Law Review, vol. 86, No. 3, pp. 451-506; Feb. 2008.

Lobo, Jude, "MySAP.com Enterprise Portal Cookbook," SAP Technical Delivery, Feb. 2002, vol. 1, pp. 1-13.

Lund, Graham, "Credit Bureau Data: Maximizing the Benefits," Credit Management, May 2004, ProQuest Central, pp. 44-45.

Magid, Lawrence, J., Business Tools: When Selecting an ASP Ensure Data Mobility, Los Angeles Times, Los Angeles, CA, Feb. 26, 2001, vol. C, Issue 4, pp. 3.

"Managing Debt?" Federal Trade Commission: Consumer Information, http://www.consumer.ftc.gov/articles/0158-managing-debt, printed Mar. 22, 2013 in 4 pages.

Manilla, http://www.manilla.com/how-it-works/ printed Feb. 5, 2014 in 1 page.

Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.

Micarelli et al., "Personalized Search on the World Wide Web," The Adaptive Web, LNCS 4321, 2007, pp. 195-230.

Microsoft, "Expand the Reach of Your Business," Microsoft Business Solutions, 2004, in 16 pages.

Mint.com, http://www.mint.com/ printed Sep. 18, 2008 in 2 pages.

Mint.com, http://www.mint.com/how-it-works/ printed Feb. 5, 2013 in 2 pages.

MS Money Software by Microsoft http://www.microsoft.com/Money/default.mspx as retrieved on Sep. 17, 2008.

Mvelopes, http://www.mvelopes.com/ printed Feb. 5, 2014 in 2 pages.

My Call Credit http://www.mycallcredit.com/products.asp?product=ALR dated Dec. 10, 2005 on www.archive.org.

My Call Credit http://www.mycallcredit.com/rewrite.asp?display=faq dated Dec. 10, 2005 on www.archive.org.

My ID Alerts, "Why ID Alerts" http://www.myidalerts.com/why-id-alerts.jsps printed Apr. 3, 2012 in 2 pages.

My ID Alerts, "How it Works" http://www.myidalerts.com/how-it-works.jsps printed Apr. 3, 2012 in 3 pages.

MyRatePlan.com, "Cell Phone Buying Guide", http://web.archive.org/web/20061116103256/http://myrateplan.com/cell_phone_buying_guide/family_plans/, as archived Nov. 16, 2006 in 2 pages.

MyReceipts, http://www.myreceipts.com/, printed Oct. 16, 2012 in 1 page.

MyReceipts—How it Works, http://www.myreceipts.com/howItWorks.do, printed Oct. 16, 2012 in 1 page.

"Name Availability Records", Westlaw Database Directory, http://directory.westlaw.com/scope/default.asp?db=NA-ALL&RS=W...&VR=2.0 as printed Dec. 17, 2009, pp. 5.

National Alert Registry Launches RegisteredOffendersList.org to Provide Information on Registered Sex Offenders, May 16, 2005, pp. 2, http://www.prweb.com/printer/240437.htm accessed on Oct. 18, 2011.

National Alert Registry Offers Free Child Safety "Safe From Harm" DVD and Child Identification Kit, Oct. 24, 2006. pp. 2, http://www.prleap.com/pr/53170 accessed on Oct. 18, 2011.

National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.

"New for Investors: Asset Allocation, Seasoned Returns and More," Prosper, http://blog.prosper.com/2011/10/27/new-for-investors-asset-allocation-seasoned-returns-and-more/, pp. 4.

(56) References Cited

OTHER PUBLICATIONS

Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Paustian, Chuck, "Every Cardholder a King Customers get the Full Treatment at Issuers' Web Sites," Card Marketing, New York, Mar. 2001, vol. 5, No. 3, pp. 4.
Peltier, Jon, "Conditional Formatting of Excel Charts", Peltier Tech Blog, as posted Feb. 13, 2012, http://peltiertech.com/conditional-formatting-of-excel-charts/, pp. 1-5.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
PrivacyGuard, http://web.archive.org/web/20110728114049/http://www.privacyguard.com/ as archived Jul. 28, 2011 in 1 page.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Schmidt et al., "A Set of Multi-Touch Graph Interaction Techniques", ITS '10, Nov. 7-10, 2010, Saarbrucken, Germany, pp. 1-4.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
Shin, Laura, "See an Error on Your Credit Report? Credit Karma Now Makes It Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright @ Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.
Stauffer et al., "Using HTML 3.2," Second Edition, 1996, Que Publishing, pp. 192-193.
Tajik, S., "Conditional Plotting, Changing Color of Line Based on Value", MathWorks®, MATLAB Answers™, Question Posted Feb. 10, 2011 to https://www.mathworks.com/matlabcentral/answers/1156-conditional-plotting-changing-color-of-line-based-on-value?requestedDomain=www.mathworks.com, pp. 8.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wesabe.com http://www.wesabe.com/, as retrieved on Sep. 17, 2008.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
"Fraud Alert | Learn How". Fight Identity Theft. http://www.fightidentitytheft.com/flag.html, accessed on Nov. 5, 2009.
Kaushik, Nishant, "The Epic Hacking of Mat Honan and Our Identity Challenge," Aug. 7, 2012, http://blog.talkingidentity.com/2012/08/the-epic-hacking-of-mat-honan-and-our-identity-challenge.html.
LifeLock, "Personal Identity Theft Protection & Identity Theft Products," http://www.lifelock.com/lifelock-for-people, accessed Nov. 5, 2007.
Mannan et al., "Mercury: Recovering Forgotten Passwords Using Personal Devices*", Dec. 17, 2011, Pre-Proceedings of Financial Cryptography and Data Security 2011, pp. 1-16.

(56) References Cited

OTHER PUBLICATIONS

Pinola, Melanie, "How Can I Protect Against Social Engineering Hacks?" Aug. 9, 2012, http://lifehacker.com/5933296/how-can-i-protect-against-hackers-who-use-sneaky-social-engineering-techniques-to-get-into-my-accounts.

Reppler.com, "Learn More: Basic Information about how TrustedID Reppler Works for You," www.reppler.com/learn/ printed Oct. 24, 2012 in 2 pages.

Sealey, Geraldine, "Child ID Theft Can Go Unnoticed for Years", http://abcnews.go.com/US/story?id=90257, Sep. 12, 2003 in 9 pages.

TheMorningCall.Com, "Cheap Ways to Foil Identity Theft," www.mcall.com/business/columnists/all-karp.5920748jul01,0 . . . , published Jul. 1, 2007.

Thompson, Herbert H., "How I Stole Someone's Identity", http://www.scientificamerican.com/article/anatomy-of-a-social-hack/#, Aug. 18, 2008, pp. 5.

Todorova, Aleksandra, "Protecting Your Child's Identity", Smart Money, Published Aug. 2, 2007, pp. 1-5.

\* cited by examiner

US 10,482,532 B1

PROVIDING CREDIT DATA IN SEARCH RESULTS

CROSS-REFERENCE TO RELATED APPLICATIONS

This application is a continuation of U.S. Nonprovisional application Ser. No. 14/254,561, filed Apr. 16, 2014, the entirety of which is hereby incorporated herein by reference.

BACKGROUND

The credit score is an important indicator of a consumer's financial health. A consumer's credit score may impact availability and/or terms (e.g., interest rate) of such things as credit cards, loans, rentals, and real estate mortgages, as well as impacting the consumer's ability to find employment. Because a consumer's credit score may impact the availability of such things, consumers have a substantial interest in receiving information regarding the consumer's credit score.

SUMMARY

In one embodiment, a credit report system comprises one or more hardware computer processors and one or more storage devices. The storage devices may be configured to store software instructions for execution by the hardware processors. The system may be configured to receive information from the consumer requesting information over a network, such as a search query from a consumer requesting search results from a search engine. Based on the received information, the credit report system may determine whether or not credit data is relevant to the consumer's request for information and/or attributes of the consumer. If the received information is relevant to credit data, the credit report system may access credit data associated with the consumer, possibly after authenticating the consumer's identity. The system may then generate a user interface with the information requested by the consumer and the credit data associated with the consumer and/or they provide the credit data to another service (e.g., a search engine) for insertion into the information requested by the consumer, such as at the top of search results provided to the consumer.

DETAILED DESCRIPTION

Although several embodiments, examples and illustrations are disclosed below, the inventions described herein extend beyond the specifically disclosed embodiments, examples and illustrations and includes other uses of the inventions and modifications and equivalents thereof. Embodiments are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, various embodiments can comprise several novel features and no single feature is solely responsible for its desirable attributes or is essential to practicing the inventions herein described.

Sample User Interfaces for Providing Credit Data

Figure 1A:
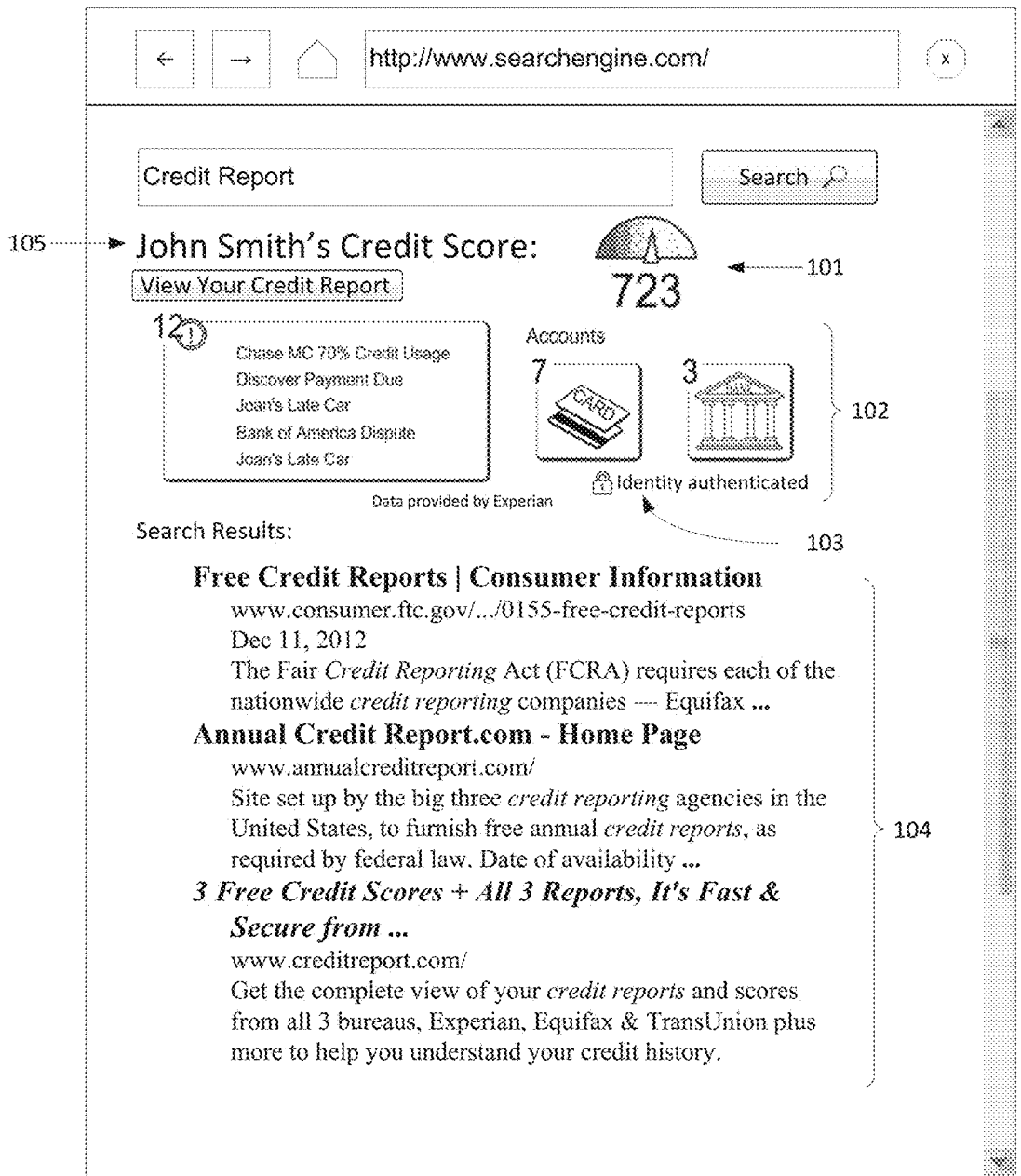
FIGS. 1A and 1B are sample user interfaces which provide a consumer's credit data alongside search results, as used in an embodiment.
Figure 1B:
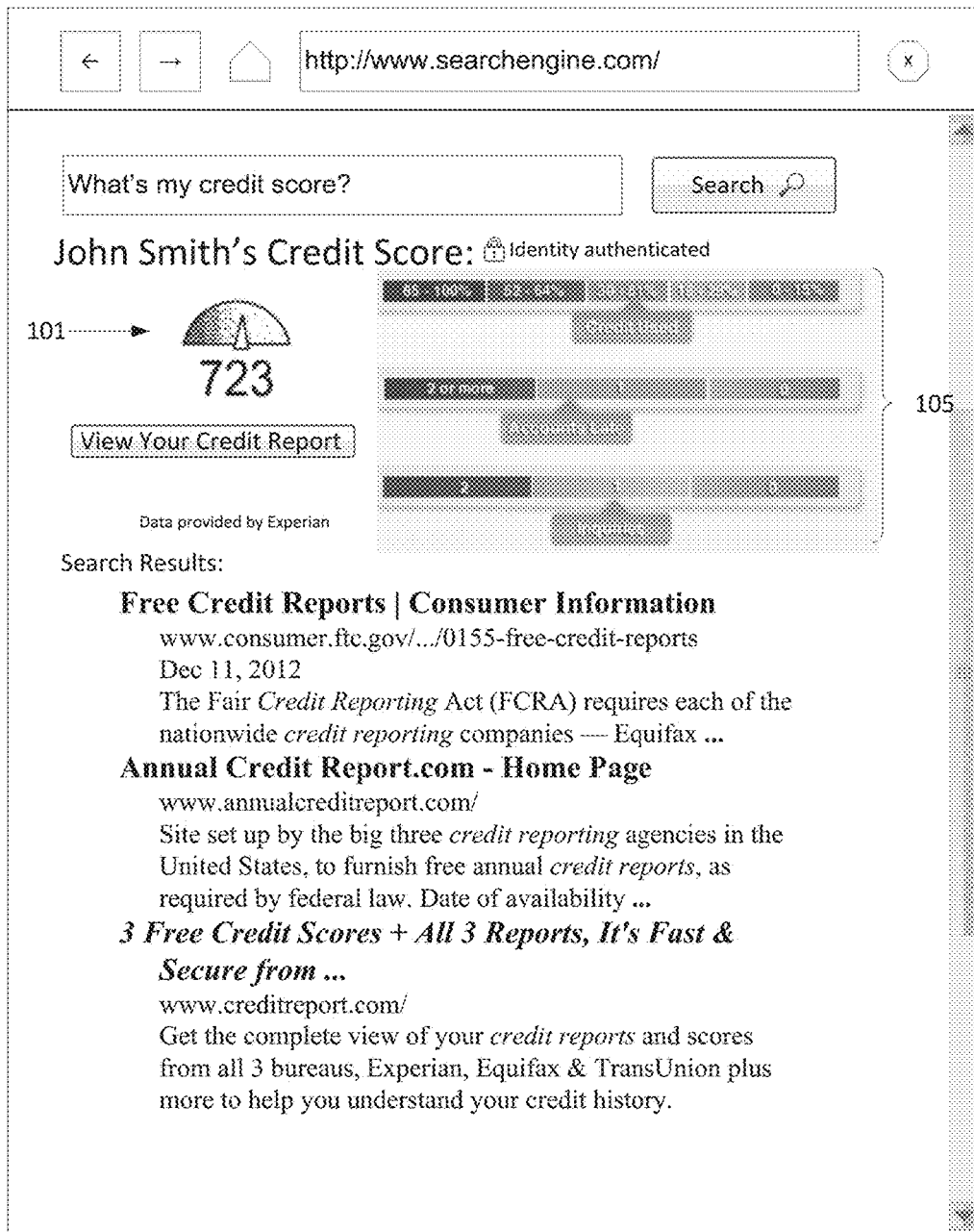

FIGS. 1A and 1B are example user interfaces showing a consumer's credit score 101 included with search results 104 for that consumer. The consumer's credit score 101 may be provided by a credit report system 100 (see, e.g., FIGS. 8A, 8B, 9, and 10). In some embodiments, the credit report system 100 may identify that the consumer has entered a search query including one or more terms having some relevance to a consumer's credit score, credit report, financing ability, ability to rent, etc. For example, such term, such as "credit," "loan," "mortgage," "rental," "credit card," "late payment," "finance," "refinance," etc., may indicate that the consumer's credit data is relevant to information that the examiner seeks in performing the search. For example, in FIG. 1A, the consumer's search query included the search term "Credit Report." The credit report system 100 may have determined these words are relevant and therefore provided the consumer with a credit score 101 and additional credit information 102. As discussed in further detail below, the credit report system 100 may have access to search queries of individuals, and the ability to include credit score information in the search results, via one or more of several different arrangements with the search engine provider.

In some embodiments, the credit report system 100 may also determine that credit information may be relevant to a consumer based on the search results 104. For example, the consumer may search for a credit union by name without the terms "credit union" or other words related to credit (e.g., "EBFCU"). However, the credit report system 100 may analyze the text or other information included in the search results 104 and/or on the webpages linked to by the search results. If the search results include a significant amount of information relevant to credit scores and/or credit reports (e.g., one or more of the terms noted above, or other terms, indicative of the consumer's current interest in credit data), then the credit report system 100 may provide credit information along with the search results. In some embodiments, webpages that are determined to be relevant to a consumer's credit may be stored in a database. In such embodiments, the credit report system may determine that credit information should be provided to a consumer based on inclusion of such webpages in search results provided to the consumer without needing to re-analyze the webpages that have already been analyzed for relevance to credit data.

In one embodiment, the credit report system 100 may determine which search terms and search results are relevant to credit reports and/or credit scores by comparing the words identified in search terms and results to words located in a database accessible to the credit report system 100. Such a database may contain terms relevant to and synonymous with credit, credit instruments, credit lenders, and/or credit monitoring and reporting systems, such as the terms noted above. The database of terms relevant to credit may be updated manually by an entity operating the credit report system 100 or may be updated automatically. For example if particular searches lead to credit related search results, those terms may be added to the database of credit related terms. Depending on the embodiment, some combination of terms may be required in order to initiate retrieval of credit data associated with the consumer. For example, terms may be weighted, such that use of query terms like "credit report" or "credit score" automatically result in a determination that credit data should be provided to the consumer. However, terms such as "loan" or "purchase" may not alone trigger collection of credit data, but in combination with other such words (e.g., a minimum quantity of words) may trigger retrieval of credit data of the consumer. In some embodiments terms (e.g., one or more words) may be weighted based on where they occur on a webpage. For example, terms appearing in the URL of a webpage or in titles may be given greater weight than terms appearing in other parts of a webpage.

In the examples of FIGS. 1A and 1B, the consumer's credit information is presented at the top of the search results. In some embodiments, the consumer's credit information may be presented in other locations, such as at the bottom of the search results, as a banner on one side or the other of the search results, in the middle of the search results at a relevant location, or in a pop-up window, for example. The location of the credit data relative to the search results may change depending on the search performed, the results from the search engine, and/or the search engine performing the search. For example, credit information may be displayed near search results that are relevant to credit instead of near other search results which are not as relevant to credit. In some embodiments, credit data may be presented along with results associated with a particular entity, such as the entity operating credit report system 100. For example, if Big Credit Bureau operates the credit report system 100 and the search results responsive to a consumer's query return a website owned by Big Credit Bureau, the credit data of the consumer may be displayed in association with the search result summary information of Big Credit Bureau.

In some embodiments the credit information is placed into the search results by the search engine provider. In some embodiments, the credit information is placed into the search results by the browser from which the consumer is accessing the search engine. In some embodiments, the credit data may be presented as an image to be presented along with the search results. The credit data may be presented with interactive elements from which the consumer can take one or more actions. In some embodiments, clicking on, or otherwise selecting, the presented credit data may link the consumer to a webpage associated with the credit report system 100. In some embodiments, the credit data may be presented to the consumer as multiple separate elements. The consumer may be directed to different websites or webpages depending on the elements selected by the consumer.

As shown in various example user interfaces, the consumer may be presented with additional credit data in addition to the consumer's credit score 101. For example, in FIG. 1A, the consumer is presented with the consumer's credit score 101 as well as other credit report information 102 including visual indicators summarizing accounts on the consumer's credit report. In the example of FIG. 1A, the credit report system 100 also displays the consumer's identification 105 and an indicator 103 informing the consumer that his identity has been authenticated. Consumer authentication is important to assure the credit report system 100 only provides a consumer's credit information to that consumer. Some embodiments of consumer authentication are discussed in reference to FIGS. 3A, 3B, 4A and 4B below, but any other authentication mechanisms may be used to authenticate the consumer. In some embodiments, the credit report system 100 may present the consumer with other information relevant to the consumer's credit. For example, in FIG. 1B, the consumer is provided with information describing how the various credit score factors 105 are reflected in the consumer's credit report. In other embodiments, fewer or additional pieces of information may be provided.

Figure 2A:
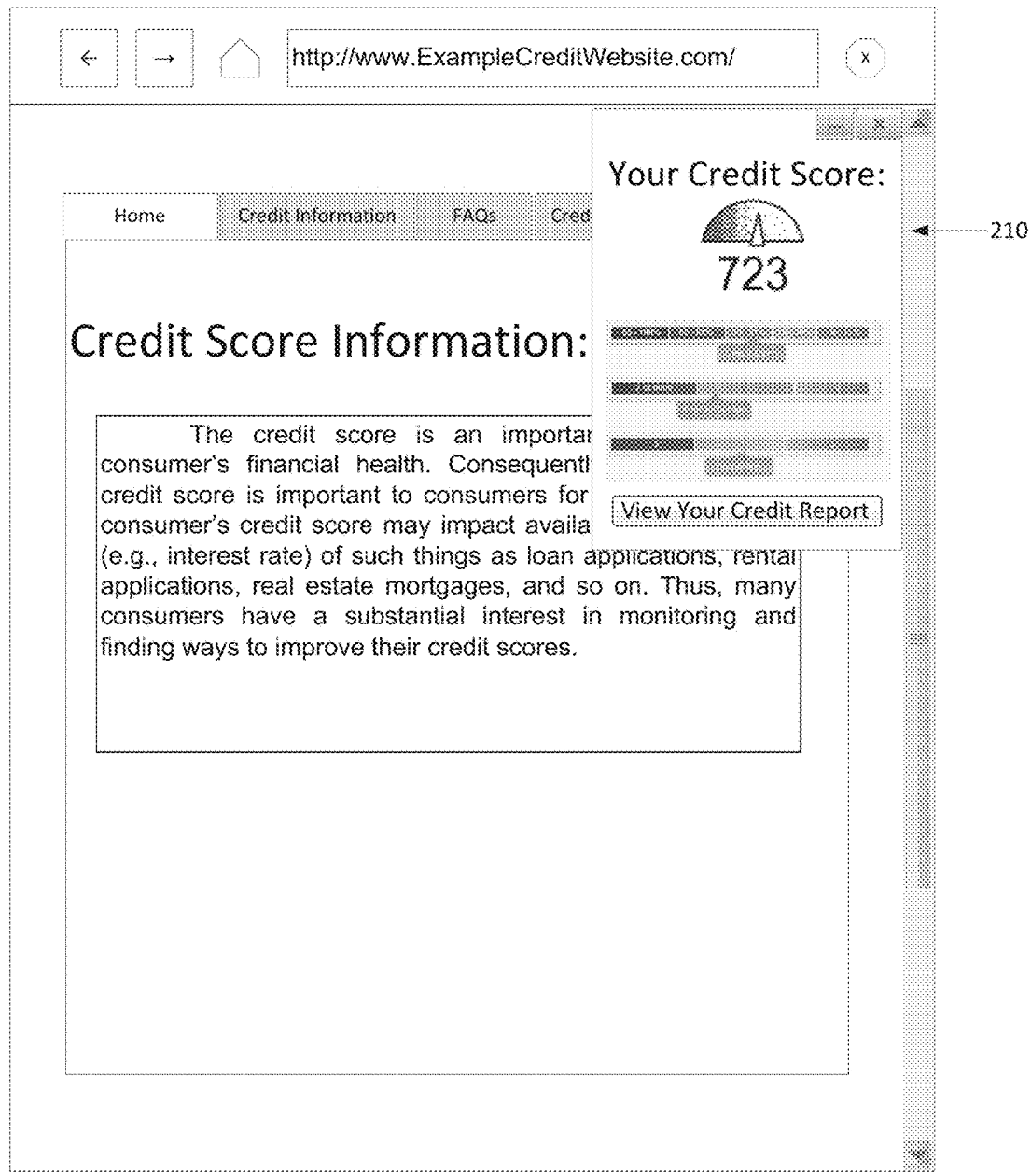
FIGS. 2A and 2B are sample user interfaces which provide a consumer's credit data alongside a webpage, as used in an embodiment.
Figure 2B:
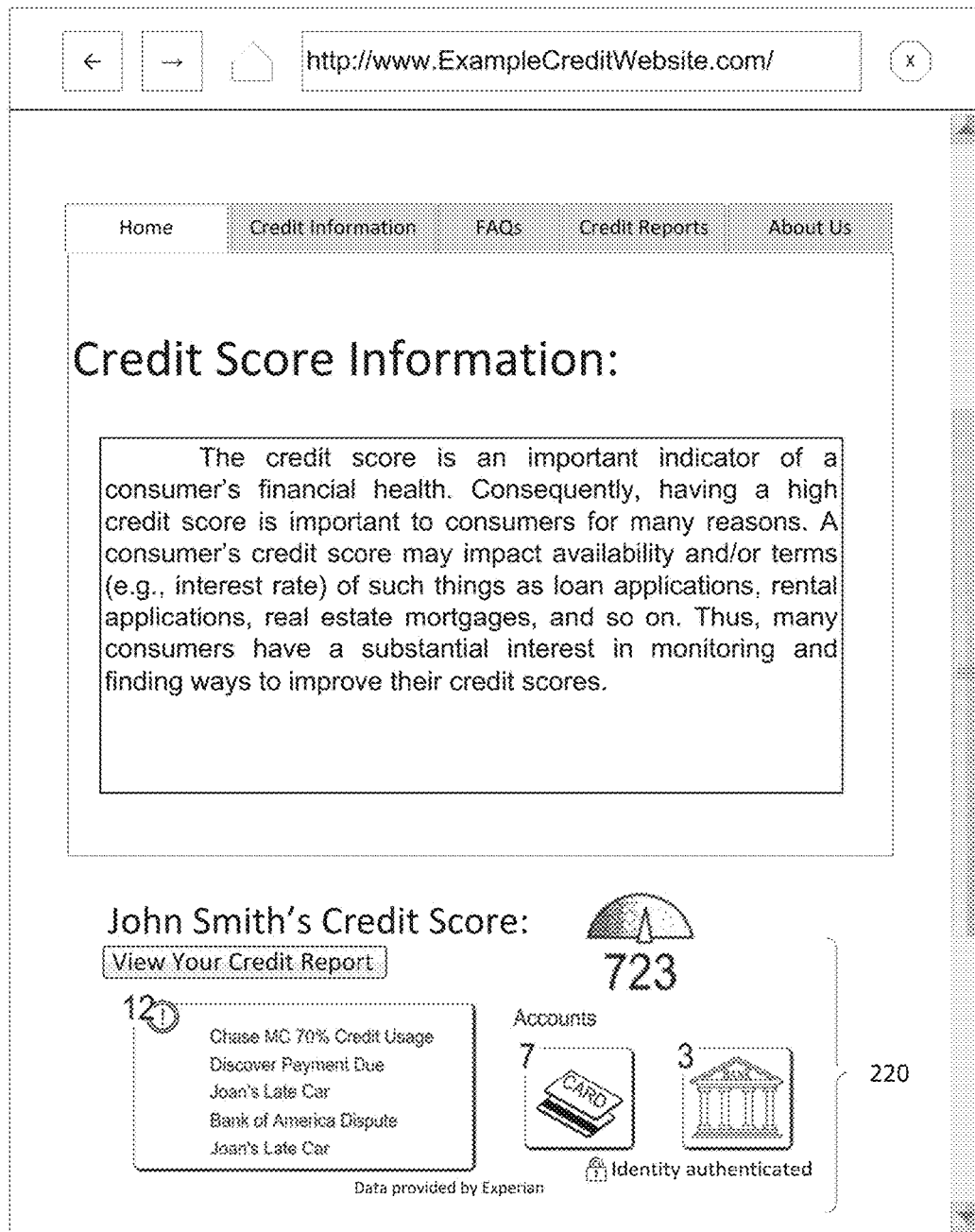

FIGS. 2A and 2B are example user interfaces that may be generated by a credit report system 100 to provide credit data to a consumer accessing webpages from a browser. In this embodiment, in response to requests for certain webpages or interactions with webpages (e.g., other than a search query provided to a search engine) the credit report system 100 may present similar information as is presented in the embodiments described in reference to FIGS. 1A and 1B, such as the consumer's credit score, information about the consumer's credit accounts, information about the consumer's credit score factors, and the like.

In some embodiments, the credit report system 100 may identify relevant webpages accessed by a consumer and then provide relevant credit information. For example, the credit report system 100 may provide an add-on, plug-in, enhancement or other similar program for a web browser. Such web browsers may include, for example, FireFox, Internet Explorer, Chrome, Safari, or other browsers enabling a consumer to access information over a network. Through the provided add-on or other similar program, the credit report system may identify text on webpages accessed by the browser. For example, the add-on may parse information included on a webpage (possibly before the webpage is rendered in the browser) to determine if the threshold quantity and/or weighting of terms are included in the webpage to initiate retrieval of credit data for the consumer. Thus, if the webpages contain terms, images, or other data relevant to credit scores and/or credit reports, the credit report system 100 may provide credit data to the consumer. In some embodiments, the credit report system 100 may provide credit data in the form of a pop-up window 210 as illustrated in FIG. 2A. In some embodiments, the credit report system 100 may provide the credit data in a banner 220 on the relevant webpage as illustrated in FIG. 2B. The credit report system 100 may also provide the credit data in any other format. Some non-limiting manners to provide credit data to a consumer are as a pop-up, as a banner, as a tool bar, as an embedded window, inserted into part of the relevant webpages, and/or as a new tab.

The credit report system may also operate as a widget or standalone application on a consumer's computing device. For example, the consumer may install software on a computing device capable of monitoring information accessed over one or more networks. If the software identifies information relevant to credit scores and/or credit reports, the software may display a user interface containing credit data for the consumer (or possibly request information for authenticating the consumer prior to displaying credit information of the consumer). In some embodiments, the credit report system 100 may provide credit report widgets or applications for operation on a desktop or laptop computer, on a mobile computing device, on a tablet, and/or on other computing devices. The user interfaces described in FIGS. 2A and 2B may require the consumer authentication as described in reference to FIGS. 1A and 1B and discussed further below.

Sample User Interfaces for Consumer Authentication

As discussed in reference to FIGS. 1A and 1B, credit report system 100 may authenticate a consumer's identity before providing the consumer's credit data. FIGS. 3A, 3B, 4A, and 4B are example user interfaces used in conjunction with authenticating a consumer's identity.

Figure 3A:
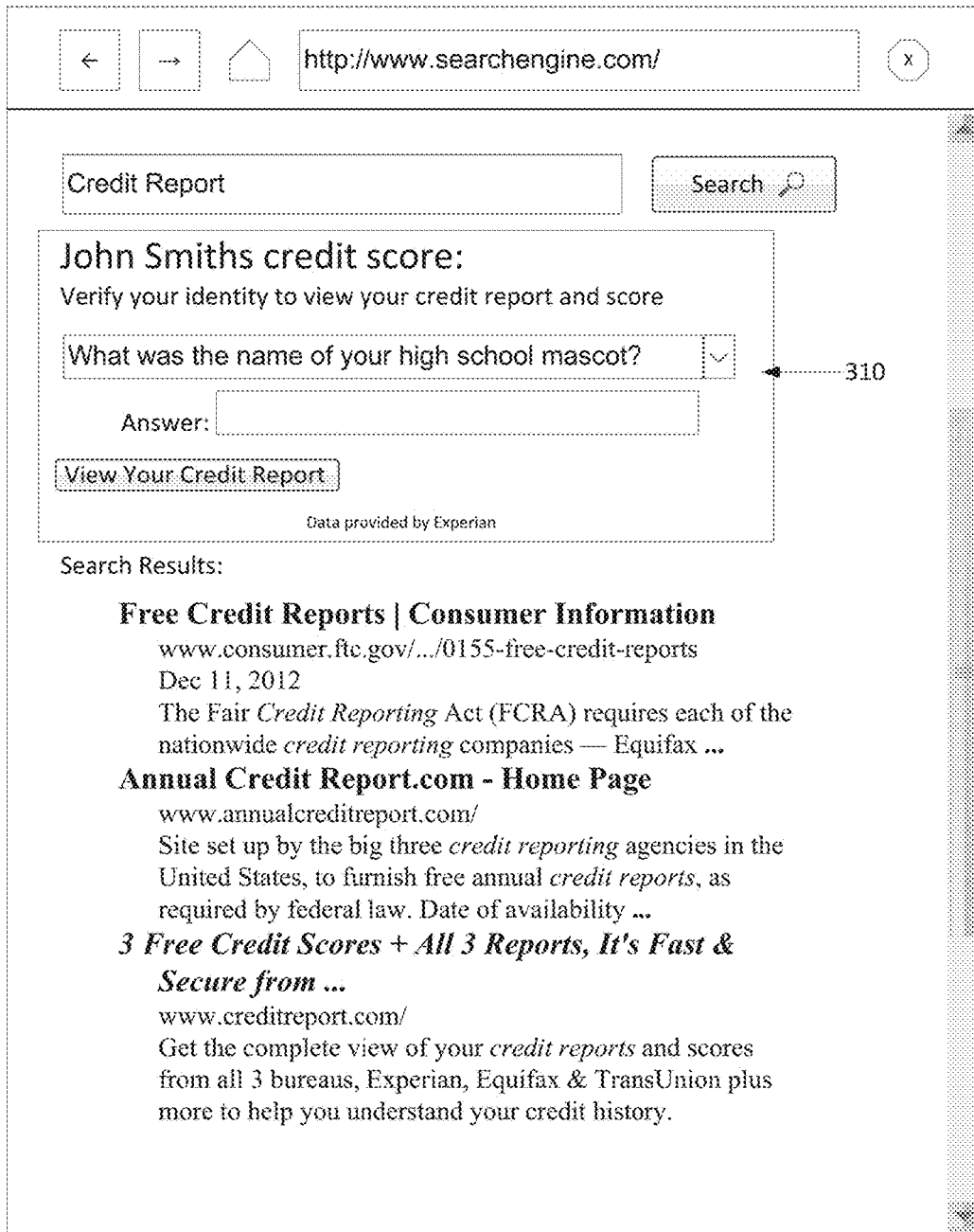
FIGS. 3A and 3B are sample user interfaces which enable a consumer to provide identity verification alongside search results, as used in an embodiment.

In the example of FIG. 3A, a consumer is presented with a security question before credit data is provided. In some embodiments, the credit report system 100 may have identified the consumer and only needs to confirm the consumer's identity to continue. For example, the credit report system 100 may recognize that the consumer has logged into the browser with a particular identity. However, to confirm that the consumer is the person actively using the browser, the credit report system 100 may also require additional information from the consumer. For example, in FIG. 3A, the credit report system 100 requests an answer to a security question 310. In some embodiments, the security question may have been setup by the consumer with the credit report system 100. The credit report system 100 may also generate security questions for the consumer using out-of-wallet data collected about the consumer, such as information included in credit data of the consumer or other secure data sources that are not publicly available. In some embodiments, the credit report system requires the consumer to enter other identifying information such as a social security number, date of birth, and/or address, for example. The credit report system 100 may compare the additional information to information stored about the consumer in a credit bureau, credit database, or other database with identifying information.

Figure 3B:
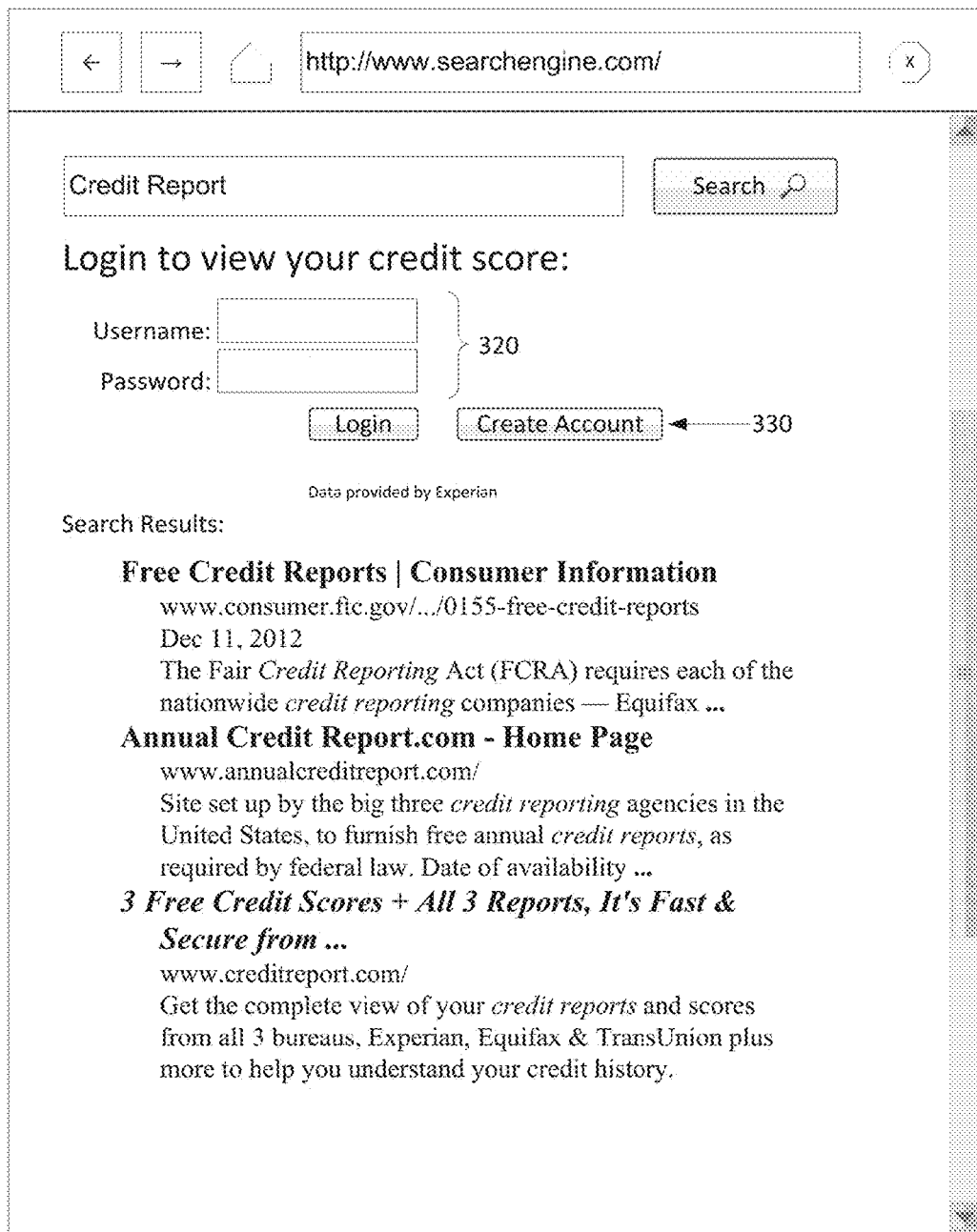

In some embodiments, the credit report system may provide the consumer with the option to login to the credit report system 100 to view credit data. For example, in FIG. 3B, the credit report system 100 provides fields 320 for the consumer to enter a username and password. If the consumer provides a valid username and password, the credit report system may then update the user interface to provide credit data as described in reference to FIGS. 1A and 1B. In some embodiments, the credit report system 100 may also enable the consumer to sign up for an account. In FIG. 3B, the consumer is provided with a selectable button 330 which enables a consumer to create an account. Selecting the create account button 330 may update the user interface to request additional information from the consumer (e.g. name, date of birth, social security number, etc.), or may bring the consumer to another webpage associated with the credit report system 100 which may then enable the consumer to setup an account. The account may be a credit monitoring account, an identity protection account, a financial account, or any other type of account.

The credit report system 100 may determine when to display the user interfaces described in reference to FIGS. 3A and 3B using the same or similar analysis as described with reference to FIGS. 1A and 1B. For example, the credit report system 100 may attempt to confirm a consumer's identity before providing credit data when one of the results of the consumer's search includes a website associated with credit report system 100. If the credit report system 100 is successful in confirming the identity of a consumer, it may then present credit data as described with reference to FIGS. 1A and 1B. In some embodiments the consumer may not need to provide additional authentication when the credit report system 100 recognizes webpages and/or search terms related to credit data. For example, the credit report system may provide cookies or tags which uniquely identify a consumer on the consumer's device. For example the consumer may login or provide authentication before or during a first search and a tag or cookie may be placed on the user's system. Then credit report system 100 may not require the consumer to provide the authentication a second time if another search related to credit data is performed later, but may instead authenticate the consumer by accessing the stored cookie or tag.

Figure 4A:
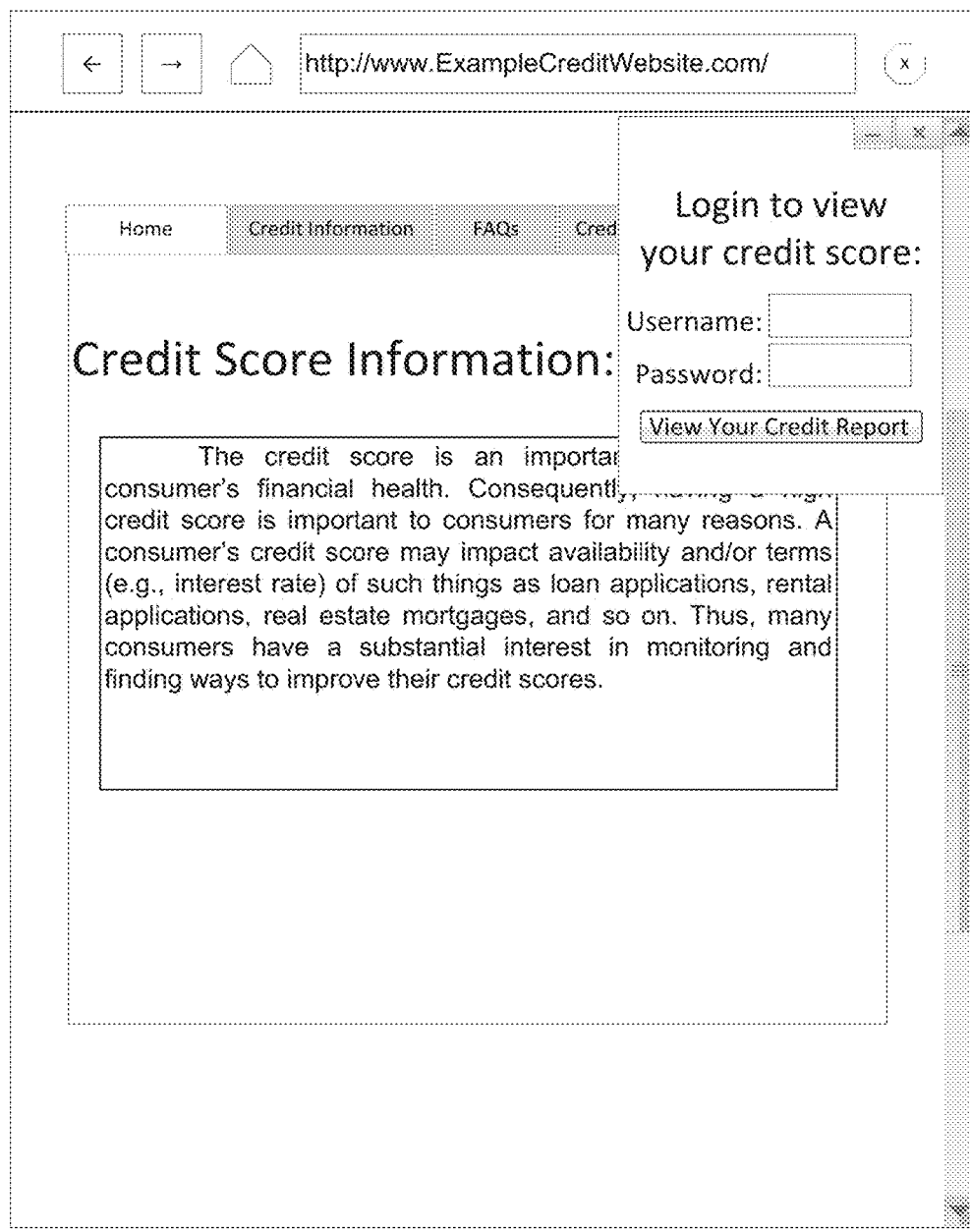
FIGS. 4A and 4B are sample user interfaces which enable a consumer to provide identity verification alongside a webpage, as used in an embodiment.
Figure 4B:
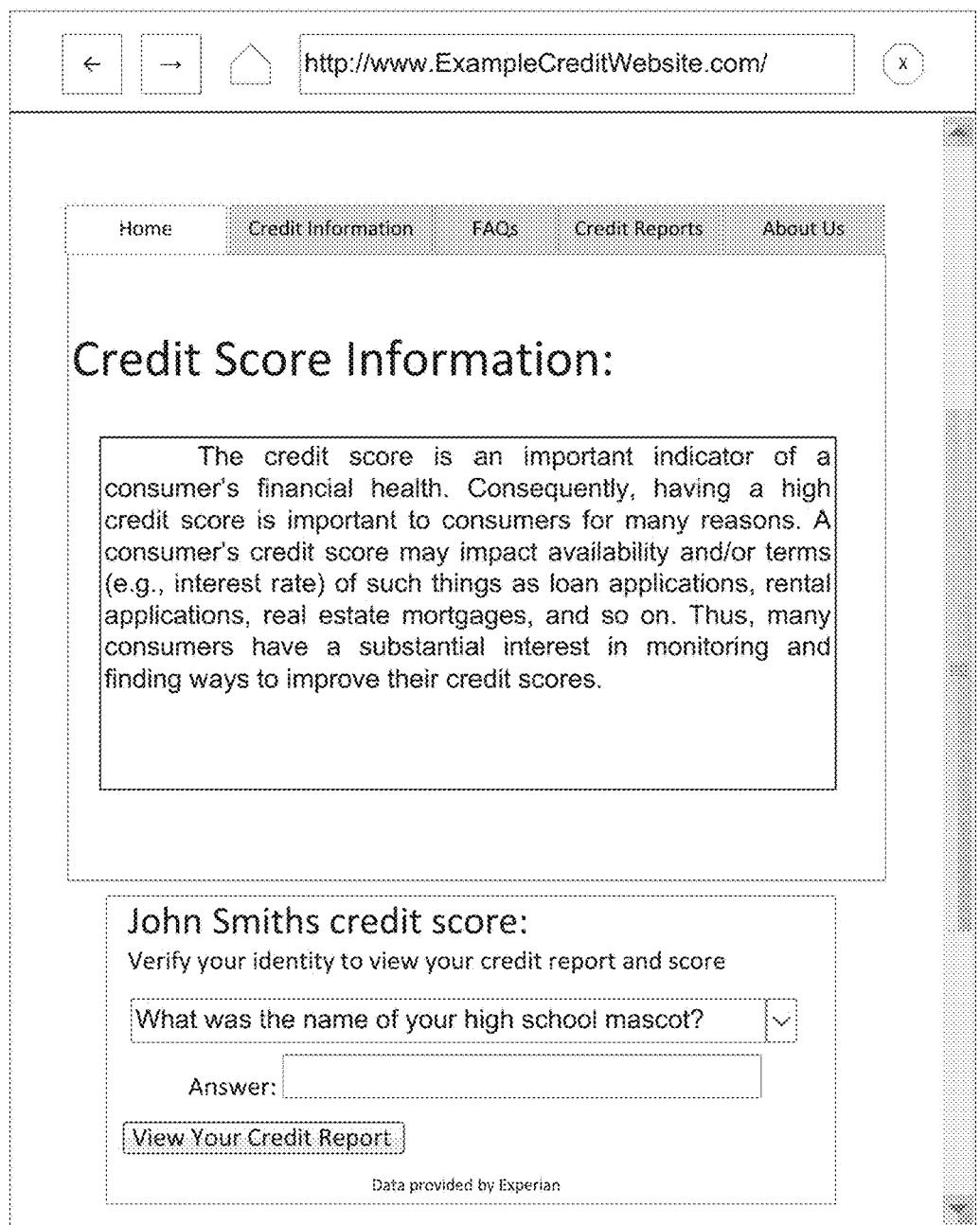

FIGS. 4A and 4B provide additional examples of user interfaces provided by the credit report system 100 that may be used to confirm the identity of a consumer. The examples in FIGS. 4A and 4B may be provided in response to the consumer accessing information related to credit at various websites. For example, the user interfaces illustrated in FIGS. 4A and 4B may be provided prior to providing credit data of the consumer, such as in FIGS. 2A and 2B, if the consumer's identity is not otherwise confirmed. The examples in FIGS. 4A and 4B may be provided in the same manner as discussed in reference to FIGS. 2A and 2B. For example, the user interface may be provided as a pop-up window, as a banner, as a tool bar, as an embedded window, inserted into part of the relevant webpages, and/or as a new tab. The credit report system 100 may provide the user interfaces illustrated in FIGS. 4A and 4B or other similar interfaces through an add-on, plug-in, enhancement or other similar program for a web browser, and/or as a stand-alone program or widget for a computer or mobile device. In FIGS. 4A and 4B, the credit report system 100 may authenticate the identity of a consumer in a manner similar to those discussed with reference to FIGS. 3A and 3B. For example, in FIG. 4A, the credit report system 100 provides a user interface enabling the consumer to login to the credit report system. In FIG. 4B, the credit report system 100 requests an answer to a security question as discussed in reference to FIG. 4A. In other embodiments, any other form of identity verification may be used.

Figure 5:
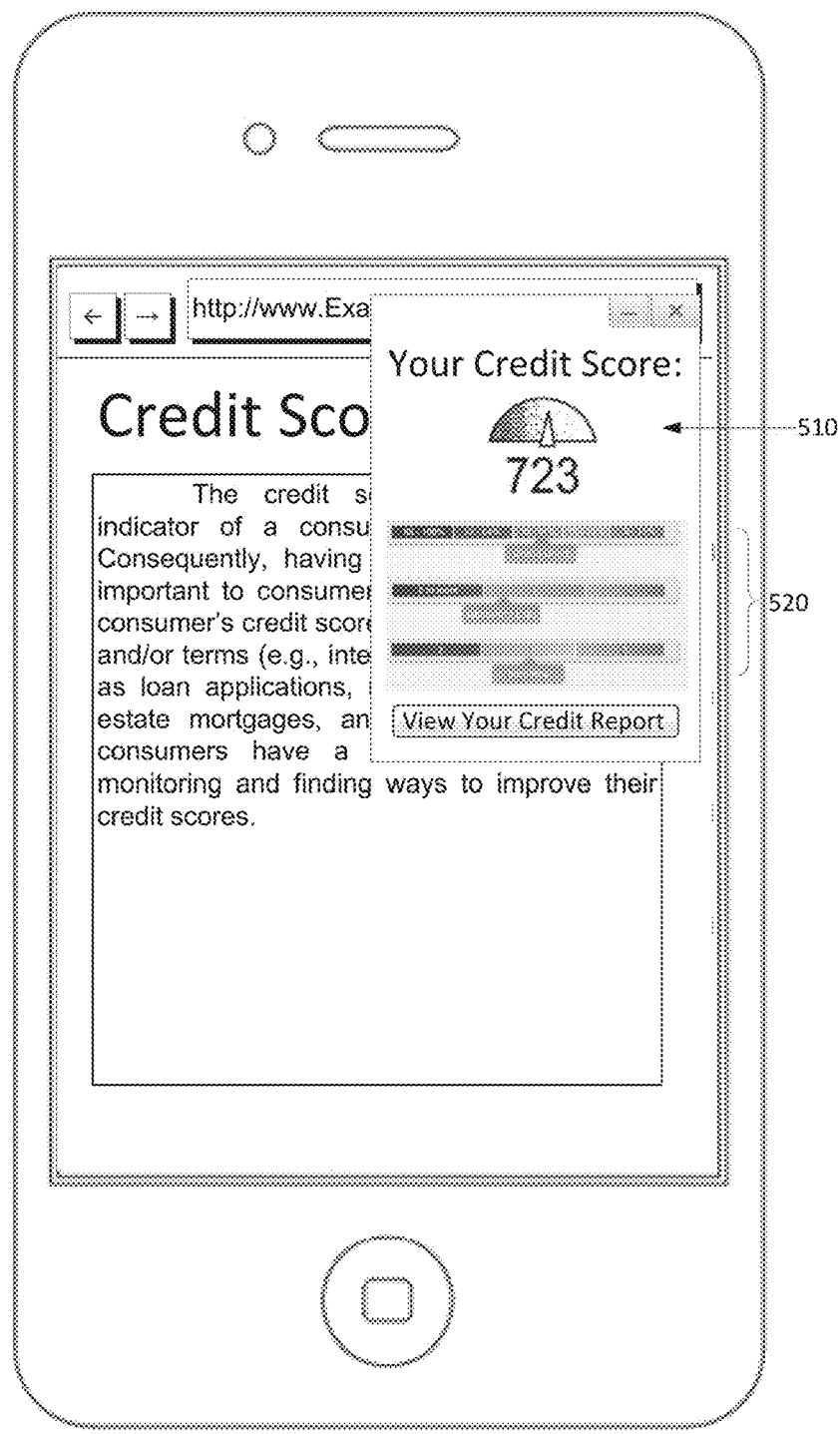
FIG. 5 is a sample mobile user interface which provides a consumer's credit data in response to accessing credit related data, as used in an embodiment.

Sample Mobile User Interfaces:

FIG. 5 is an example mobile user interface including a consumer's credit information presented on a webpage related to credit events. Any of the user interfaces discussed above may also be configured to operate on a mobile device. In the example of FIG. 5, the credit report system 100 presents the consumer with credit data including a credit score 510 and credit score factors 520. In some embodiments, the credit report system 100 may provide different credit data. The credit report system 100 may provide a user interface in response to determining that the consumer is searching for, is requesting access to, and/or has accessed data indicating that credit data may be useful to the consumer. The credit report system 100 may make that determination in the same or similar manner as discussed with reference to FIGS. 1A, 1B, 2A, and 2B. In some embodiments, the consumer may be asked to provide identity authentication as discussed in reference to FIGS. 3A, 3B, 4A, and 4B. In some embodiments, the consumer's identity may be verified based on identity data stored in the consumer's mobile device for use with other applications.

In some embodiments, the credit report system 100 may provide mobile user interfaces as a stand-alone application or widget on the mobile device. For example, the credit report system 100 may provide program instructions for execution by processors on the mobile device. The program may monitor other applications running on the mobile device. If the program determines the consumer is requesting access to and/or accessing information that may indicate an interest in credit data, the credit report system 100 may provide the consumer with credit data as illustrated in FIG. 5. In some embodiments, the credit report system 100 may instead display a notification, such as a notification offering to provide credit data to the consumer, in response to determining the consumer is accessing or requesting access to such information. If the consumer selects the notification, the credit report system 100 may display credit data to the consumer, for example, as shown in FIG. 5. In some embodiments, the credit report system 100 may provide mobile user interfaces as part of other applications. For example, the user interface may be presented as part of an email application, a search engine, a web browser, and/or other apps that may indicate a consumer's interest in credit data.

Figure 6:
FIG. 6 is a sample mobile user interface which provides a consumer's credit data in response to receiving location data indicating credit data may be useful, as used in an embodiment.

FIG. 6 is an example mobile user interface displaying a consumer's credit data alongside a map or navigation application. The user interface in FIG. 6 may be generated by the credit report system 100 as discussed in reference to FIG. 5 above. For example, the credit report system 100 may provide credit data through a stand-alone mobile application or widget, or may provide the credit data through another mobile application (e.g. a navigation program). The user interface illustrated in FIG. 6 provides an additional example of how the credit report system 100 determines that credit data may be relevant to the consumer's current activity. For example, In FIG. 6, the credit report system 100 may have monitored the consumer's destination on a mapping or navigation application to determine that the consumer is driving to a car dealership. The credit report system 100 may have determined that a consumer driving to a car dealership is likely looking to purchase a car and may need a loan. In response, the credit report system 100 may automatically provide credit data to the consumer. The consumer may then conveniently view data relevant to possibly applying for a loan. In some embodiments, the credit report system 100 may provide credit data when the consumer sets various destinations, for example car dealerships, banks, homes currently for sale, realty offices, or other destinations that may indicate the consumer may benefit from viewing credit data In some embodiments the credit report system 100 not only monitors destinations of the consumer on a navigation program, but also monitors the consumer's location by GPS. Many mobile applications monitor the devices GPS location. The credit report system may monitor the consumer's location through a mobile device to determine if credit data may be relevant to the consumer. For example, if the consumer goes to a car dealership the mobile device may receive an indication of the consumer's GPS location. Either the credit report system 100, or another application, may determine what is located at various GPS locations the consumer visited. The credit report system may then use information about destinations visited by the consumer to determine whether or not to display credit data. For example, the consumer may have visited GPS coordinates that are known to be associated with a car dealership. The credit report system 100 may then display credit data to the consumer to help inform the consumer before applying for loans. The credit report system 100 may determine to provide credit data in response to the consumer visiting various locations. For example the credit report system may provide credit data when the consumer visits car dealerships, banks, homes currently for sale, realty offices, or other destinations that may indicate the consumer may benefit from viewing credit data.

In some embodiments, location information may be combined with other information, such as search history, search queries, etc., in order to determine that credit information may be desired by the consumer. For example, if the consumer had previously been searching for mortgage information via a search engine, but the credit report system 100 had not yet determined that credit data should be offered to the consumer, when the consumer is located at a lender location, the combination of the previous search queries and the location of the consumer may initiate retrieval of credit data to provide to the consumer. In other embodiments, other combinations of data associated with the consumer may initiate retrieval of credit data for the consumer (possibly after authentication).

Figure 7:
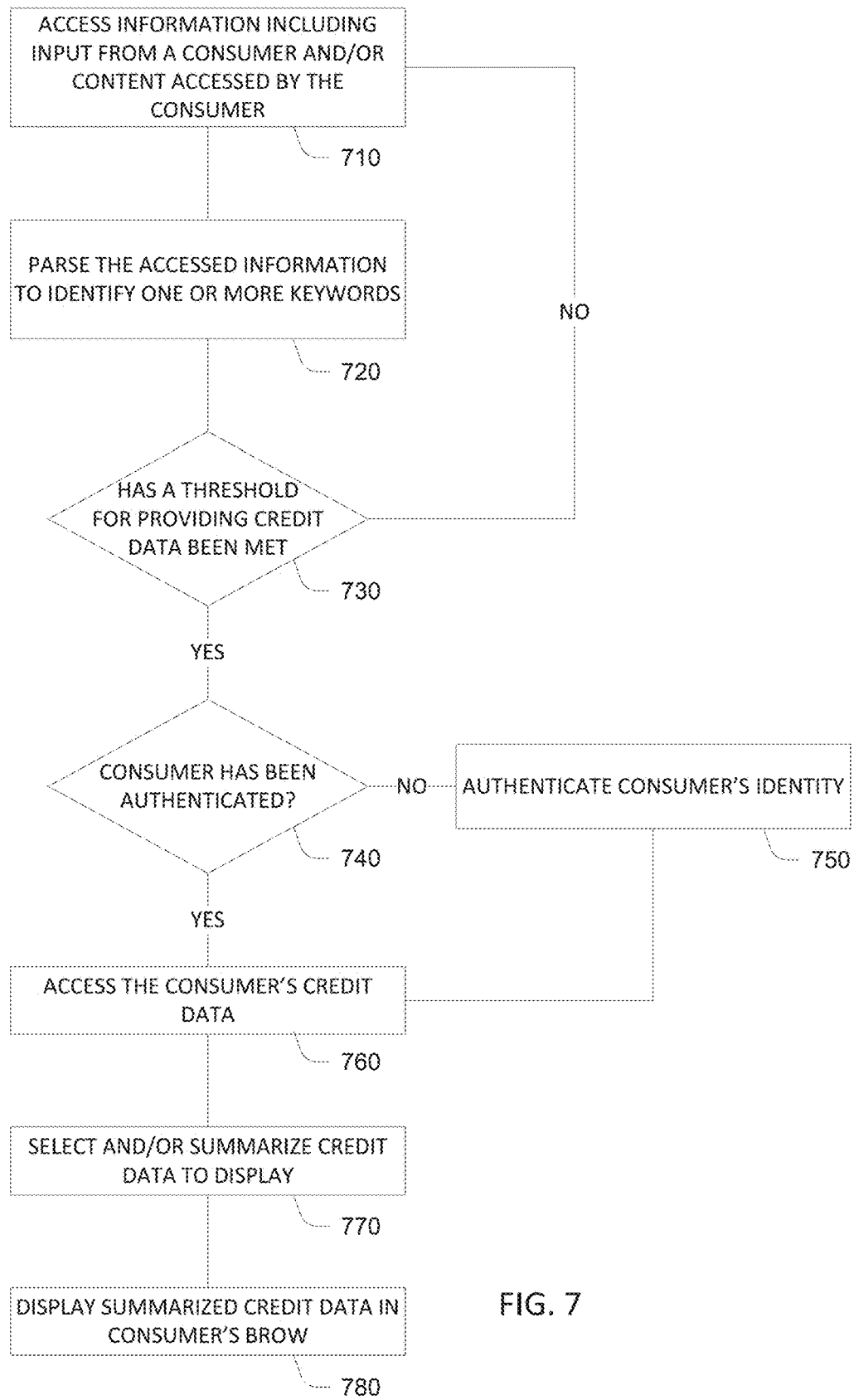
FIG. 7 is a flowchart illustrating one embodiment of a process for providing credit data to a consumer.

Example Flowcharts:

FIG. 7 is an example flowchart illustrating one example of a process of providing credit data in a consumer's search results or based on information accessed through the consumer's web browser or other software for accessing information, whether networked information or locally stored information. The flowchart illustrated in FIG. 7 and described below are example processes which may be performed by the bill payment system 100 and/or other suitable computing systems, such as consumer computing devices. In some embodiments, fewer or additional blocks may be present, or the processes may be performed in a different order than shown in the figures.

Beginning in block 710 of FIG. 7, the credit report system 100 accesses information including input from a consumer and/or content accessed by the consumer. Such information may include search terms from a consumer, search results, webpages identified in search results, webpages accessed by the consumer, and/or other information entered by a consumer. In some embodiments, only some types of information may be accessed by the credit report system. For example, in some embodiments, only information related to search term and search results is accessed. In some embodiments, the credit report system may only access information on webpages accessed by the consumer. In some embodiments, the credit report system 100 may monitor the information entered into input fields in various applications used by the consumer or the information accessed by the consumer. For example, the credit report system 100 may access content on webpages accessed by the consumer through the consumer's browser. The credit report system 100 may also monitor inputs directly from input devices such as a keyboard, mouse, or touchscreen.

Moving on to block 720, the credit report system 100 may parse the accessed information to identify one or more keywords. Such keywords may include terms related to credit (e.g. "credit," "loan," etc.), entities which provide credit (e.g. "Visa," "MasterCard," etc.), activities that may require credit (e.g. "new cars," "realtors," etc.), or other terms which indicate credit data may be useful to a consumer. The credit report system may identify keywords by comparing the information accessed in block 710 to terms stored in a data structure associated with the credit report system 100. In some embodiments, the data structure may contain a list of keywords relevant to credit. In some embodiments the data structure may also include weightings for the keywords, information indicating that some keywords are related to other keywords, and/or other information enabling the credit report system to identify appropriate terms.

In block 730, the credit report system determines if the identified terms (the keywords identified in block 720) meet a threshold for providing credit data. In some embodiments, the threshold is set at a quantity of credit related terms that must be in the accessed information. In some embodiments, the quantity of terms required changes based on the type of information accessed. For example, if the accessed information with credit related keywords is search results entered by the consumer, the credit report system 100 may only require one credit related term. However, if the accessed information with credit related keywords is a webpage, the credit report system may require more terms. In some embodiments, the threshold is met based on a combination of the number of terms and the weighting of the terms, for example, as stored in a data structure. In some embodiments an entity or computer system, other than the credit report system 100, monitors the accessed information and then sends an indication of the accessed information, the relevance of the information, and/or an indication that the threshold has been met to credit report system 100. If the threshold is not met, the method returns to block 710 and accesses additional and/or different information.

If the threshold has been met in block 730, the method continues on to block 740, where the credit report system 100 determines if the consumer has been authenticated. If the consumer has not been authenticated, then the credit report system 100 may perform block 750 and authenticate the consumer's identity. The consumer's identity may be authenticated as discussed in reference to the user interfaces illustrated in FIGS. 3A, 3B, 4A, and 4B, or in another manner. If the credit report system 100 determines in block 740 that the consumer has been authenticated or the consumer is authenticated by the credit report system 100 in block 750, then the credit report system 100 may proceed to provide credit information to the consumer.

In block 760, the credit report system 100 accesses the consumer's credit data (in some embodiments, the consumer's credit data may be accessed as part of an authentication process, such as to determine out of wallet questions to be provided to the consumer). Such data may comprise the consumer's credit report, credit score, or other information related to the consumer's credit. In some embodiments the consumer's credit data may be accessed at one or more credit bureaus and their databases. In some embodiments, the consumer's credit data is stored on the credit report system 100, in which case, retrieval of credit data from a credit bureau may not be necessary. The credit data may include a complete credit report about a consumer, summary data, such as credit attributes (also referred to as credit variables) that are calculated using various modules, such as Experian's STAGG (standard aggregation variables) attributes, and/or credit data inputs to calculate a complete or partial credit score. Each credit data input may be associated with a particular category of credit inputs, for example credit usage, payment history, age of accounts, types of accounts, or credit inquiries. In some embodiments, credit report system 100 may calculate the Summary/STAGG attributes or perform other modifications on the credit report or other credit data gathered. The credit report system 100 may also gather information about how a credit score is calculated. This may include algorithms, formulas, executable code, statistical variables, and the like.

In block 770, the credit report system 100 selects and/or summarizes credit data to provide to the consumer. Such summarizing may result in the visual representations of the consumer's credit data as illustrated in FIGS. 1A, 1B, 2A, and 2D, for example. In some embodiments the credit report system 100 may provide different credit data to a consumer depending on the terms identified in the consumer's search results. For example, if the consumer searches for "credit report" the credit report system 100 may display information to the consumer directed toward activity on the consumer's credit report. On the other hand, if the consumer searches for "car loans" the credit report system 100 may display information directed toward the consumer's credit score and ways the consumer can improve the score to qualify for better loan terms. In some embodiments, summarizing the consumer's credit data may include generating or accessing the consumer's credit score, determining credit factors for the consumer, summarizing accounts on the consumer's credit report, and/or other credit summarization relevant to the consumer's credit.

In block 780, the credit report system 100 inserts the selected and/or summarized credit data into the search results. For example, in block 760, the credit report system 100 may generate all or part of the user interfaces shown in FIGS. 1A and 1B. In some embodiments, the consumer's credit data may be inserted into the user interface by a search engine. In some other embodiments, the consumer's credit data may be inserted into the user interface by a web browser or other modules of the credit report system 100. If the consumer selects the credit data displayed by the credit report system 100 in block 780, the consumer may be redirected to a webpage associated with the credit report system 100. In some embodiments, the credit report system may display the consumer's credit data in applications other than a browser. For example, as part of a stand-alone application on a desktop computer, a widget, a mobile application, or as part any other application through which the consumer may access data relevant to credit.

Figure 8:
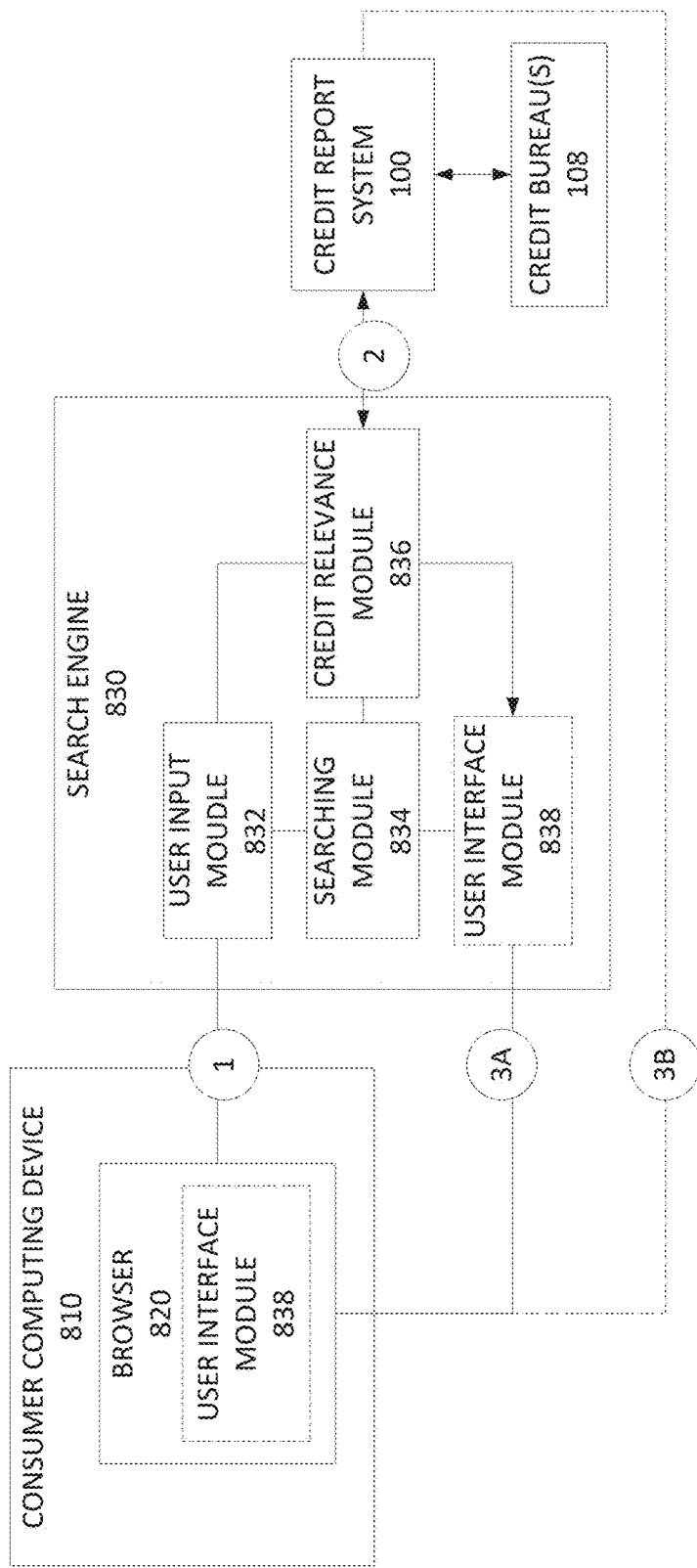
FIG. 8 is a flow diagram illustrating one embodiment of providing credit data to a consumer in the consumer's search results.
Figure 9:
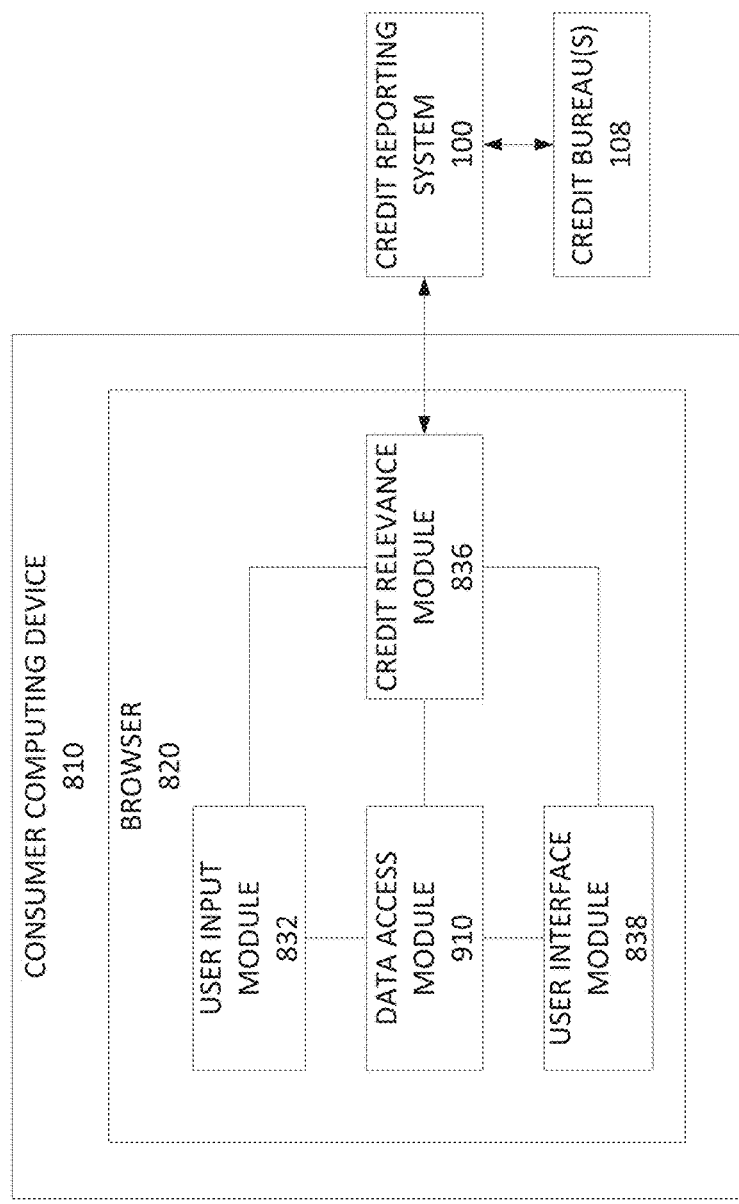
FIG. 9 is a flow diagram illustrating one embodiment of providing credit data to a consumer in the consumer's browser.

Example Flow Diagrams:

FIG. 8 is a flow diagram showing some examples of communications resulting in the credit report system 100 providing credit data in a consumer's search results. FIG. 9 is a flow diagram illustrating some examples of the credit report system 100 providing credit data in a user interface associated with a consumer's browser.

In FIG. 8, a consumer computing device 810 interacts with one or more computer systems through a browser 820. In communication 1, the consumer interacts with a search engine 830. In some embodiments the consumer may enter search terms and queries into search engine 830, and in response, the search engine will provide search results. The search results may comprise links to a variety of pages relevant to the consumer's search, summarized data from one or more sources, and/or other information relevant to the consumer's search.

As illustrated in FIG. 8, the search engine 830 may include several modules. For example, a user input module 832, a searching module 834, a user interface module 838 and a credit relevance module 836. User input module 832 may receive input from a consumer 810. For example, user input module 832 may receive text input by the consumer into a search field associated with the search engine 830. User input module 832 may also receive other input from a consumer such as mouse clicks, mouse-overs, or other selections depending on the computing device through which the consumer is accessing search engine 830.

Searching module 834 performs searches for the search engine 830. The searching module 834 may perform searches in any manner known in the art. For example, searching module 834 may perform searches by determining if there are matches between search terms in the consumer's search query and text in documents searched by the search engine 830. The searching module 834 may receive search terms with which to perform searches from user input module 832. In some embodiments, searching module 834 may provide search results to credit relevance module 836 and/or user interface module 838 for display to a consumer.

In some embodiments, credit relevance module 836 may determine if the search terms and/or the search results are relevant to credit reports and/or credit scores. For example, credit relevance module 836 may determine whether search terms or results include terms related to credit (e.g. "credit," "loan," etc.), entities which provide credit (e.g. "Visa," "MasterCard," etc.), activities that may require credit (e.g. "new cars," "realtors," etc.), or other terms which indicate credit data may be useful to a consumer. If the credit relevance module 836 does not identify terms or data relevant to credit terms or credit scores, the credit relevance module 836 may not perform any more processes. In some embodiments the credit relevance module 836 may indicate to other modules (e.g. user interface module 838) that the terms and results do not include credit related terms.

If the credit relevance module 836 identifies credit related terms, the credit relevance module 836 may communicate with credit report system 100, in communication 2, to request credit data to include with search results for the consumer. In some embodiments, the credit relevance module 836 may be provided to the search engine 830 by the credit report system 100. The credit relevance module 838 may communicate with credit report system 100 through an API provided by either the search engine 830 or the credit report system 100. In communication 2, the credit relevance module 836 may request credit data from the credit report system 100. The credit report system 100 may access credit data for the consumer from credit bureau(s) 108 or from another credit database with credit data for the consumer. Also in communication 2, the credit report system 100 may provide credit data about the consumer to credit relevance module 836. After the credit relevance module 836 receives credit data from credit report system 100, the credit relevance module 836 may provide the data to user interface module 838 included in search engine 830 for display to a consumer. In some embodiments, the user interface module is provided with credit data to configure for presentation to the consumer.

For data security, in some embodiments, the credit report system 100 may not provide the consumer's credit data through a search engine 830. For example, in communication 3B, the consumer's credit data may be provided to the consumer computing device 810 without passing the information through the search engine 830. In such embodiments, if the credit relevance module 836 does identify credit related terms, it may communicate with credit report system 100, in communication 2, to indicate that relevant search terms or results were identified. Instead of requesting credit data from the credit report system 100, the search engine 830 may pass information to the credit report system 100 enabling the credit report system 100 to communicate with the consumer computing device 810 through browser 820. In some embodiments, the search engine 830 passes a network location associated with the credit report system 100 to the consumer's browser 820. The browser 820 may then access credit data associated with the computer where it is stored at the credit report system 100 to include in the consumer's search results. The search engine 830 or credit report system 100 may also provide instructions indicating to the user interface module 838 how to include credit data received from the credit report system.

User interface module 838 included in the search engine 830 may combine the search results received from searching module 834 with credit data received from credit report system 100. In communication 3A, the user interface module may provide the search results with relevant credit data to the consumer computing device 810 through browser 820. In some embodiments, the actual credit data may not be transmitted to the browser and, rather, software code (e.g., HTML, Java, Perl, Ruby, Python, etc.) may be transmitted to the browser which the browser can execute to display the consumer's credit data and/or the search results. If a search performed by search engine 830 does not relate to credit, the user interface module 838 may provide only search results to the consumer 810 through browser 820.

In some embodiments, the consumer computing device 810 may also include a user interface module 838 which may be part of browser 820 as shown in FIG. 8. The user interface module 838 may configure information received from search engine 830 for display on consumer computing device 810. For example, in some embodiments, the search engine 830 may not include a user interface module 838, or may not provide data in a format for display to a consumer. In such cases, the user interface module 838 included in browser 820 may generate a display for consumer computing device 810 based on data received from search engine 830. In some embodiments both the search engine 830 and the browser 820 include a user interface module 838, which may perform similar functions to generate a user interface for consumer computing device 810.

In some embodiments, user interface module 838 included in search engine 830 may provide search results received from searching module 834 to the consumer through browser 820 and the credit report system 100 may provide the credit data to be included in the search results through communication 3B. The user interface module 838 included in computing device 810 may then combine the information from the search engine 830 and the credit report system 100 into a user interface for the consumer. The user interface module 838 may generate the interfaces described in reference to FIGS. 1A and 1B, or other user interfaces displaying the consumer's credit data in addition to the consumer's search results.

In some embodiments, the consumer's identity is also authenticated by the processes shown in FIG. 8. For example, if the credit relevance module 836 determines that search terms or search results are relevant to credit data, then the credit relevance module 836 may first communicate with the credit report system 100 to determine if the consumer's identity has been authenticated. If the consumer has not been authenticated, the user interface module 838 included at search engine 830 and/or the credit report system 100 may provide user interfaces enabling the consumer to provide identity authentication. For example the consumer may be provided with one or more of the user interfaces described with reference to FIG. 3A or 3B. In some embodiments, credit relevance module 836 or another computer system or module may perform identity verification before analyzing search terms or search results to determine if they are relevant to credit reports or credit scores.

FIG. 9 is a flow diagram illustrating communications used in an embodiment to provide credit data to a consumer based on user input or webpages accessed by the consumer. In some embodiments, a consumer computing device 810 may interact with one or more computer systems and/or view various webpages through a browser 820. As illustrated in FIG. 9, the browser 820 may include various modules. For example, a user input module 832, a data access module 910, a user interface module 838 and a credit relevance module 836. User input module 832 may receive input from a consumer computing device 810. For example, user input module 832 may receive text input by the consumer into fields associated with browser 820 or pages visited by the consumer 810. User input module 832 may also receive other input from a consumer such as mouse clicks, mouseovers, or other selections depending on the computing device through which the consumer is accessing browser 820.

Data access module 910 accesses webpages and/or other network locations based on input received through user input module 832. For example, data access module 910 may access web pages based on URLs received by user input module 832 from consumer computing device 810. Data access module 910 may also access data based on mouse-clicks received from the consumer, such as clicks on hyperlinks or buttons for instance. Data access module 910 may provide some or all of the data accessed to credit relevance module 836. For example, in some embodiments data access module 910 may provide text portions of data accessed to credit relevance module 836. Data access module 910 may provide different amounts or types of data to credit relevance module 836 depending on the content of the data received.

In some embodiments, credit relevance module 836 may determine if the data received from data access module 910 indicates that the data is relevant to a consumer's credit report or credit score. For example, credit relevance module 836 may determine that data accessed by data access module 910 includes terms related to credit (e.g. "credit," "loan," etc.), entities which provide credit (e.g. "Visa," "MasterCard," etc.), activities that may require credit (e.g. "new cars," "realtors," etc.), or other terms which indicate credit data may be useful to a consumer. If the credit relevance module 836 does not identify terms or data relevant to credit terms or credit scores, the credit relevance module 836 may not perform any more processes. In some embodiments the credit relevance module 836 may indicate to other modules (e.g. user interface module 838) that the terms and results do not include credit related terms. In some embodiments the credit relevance module 836 may access more data to determine if the data accessed by consumer computing device 810 is relevant to credit. For example, if the credit relevance module 836 analyzes only a portion of the data accessed by data access module 910 and determines that the data is related to cars, the credit relevance module may access additional information to determine if the data is related to car purchases, which may indicate credit data is useful to the consumer, or related to other aspects of cars such as auto repair, which may not indicate that credit data is useful to the consumer.

If the credit relevance module 836 does identify credit related terms, the credit relevance module 836 may communicate with credit report system 100 to request credit data to include with search results for the consumer. In some embodiments, the credit relevance module 836 may be provided to the search engine 830 by the credit report system 100. The credit relevance module 838 may communicate with credit report system 100 through an API provided by either the search engine 830 or the credit report system 100. In some embodiments, the credit relevance module 836 may request credit data from the credit report system 100. The credit report system 100 may access credit data for the consumer from credit bureau(s) 108 or from another credit database with credit data for the consumer. The credit report system 100 may then provide credit data about the consumer to credit relevance module 836. After the credit relevance module 836 receives credit data from credit report system 100, the credit relevance module 836 may provide the data to user interface module 838.

User interface module 838 may combine the credit data received from the credit report system 100 with data received from data access module 910 to generate a user interface to provide to consumer computing device 810. If the credit relevance module determines the accessed data is not related to credit reports and/or scores, then the user interface module 838 may provide only the accessed data in a user interface to the consumer.

In some embodiments, the credit relevance module 836 may be an add-on, plug-in, enhancement or other similar program for a web browser. Some non-limiting examples of browsers 820 may include, for example, FireFox, Internet Explorer, Chrome, and/or Safari. The credit report system 100 may provide user interface module 838 with credit data, or in some embodiments, the credit report system 100 may provide software code (e.g., HTML, Java, Perl, Ruby, Python, etc.) which the user interface module 838 may execute to display the consumer's credit data. The consumer's credit data may be provided as a pop-up, a banner, or in other manners along with the original content of the data accessed. The user interfaces described with reference to FIGS. 2A and 2B provide some non-limiting examples of user interfaces that may be provided by the processes illustrated in FIG. 9.

The block diagrams illustrated in FIGS. 8A, 8B, and 9 may in some embodiments include fewer or additional modules and systems. The modules and systems may perform fewer or additional communications than are illustrated in the figures. In some embodiments, the modules and systems may have a different configuration than is shown in the figures. For example the credit relevance module 836 may be included in credit report system 100. In such cases data may be transferred from browser 820 (in FIG. 9) or search engine 830 (in FIGS. 8A and 8B) to the credit report system 100 before credit relevance module 836 analyzes search terms, results, and/or other data.

Figure 10:
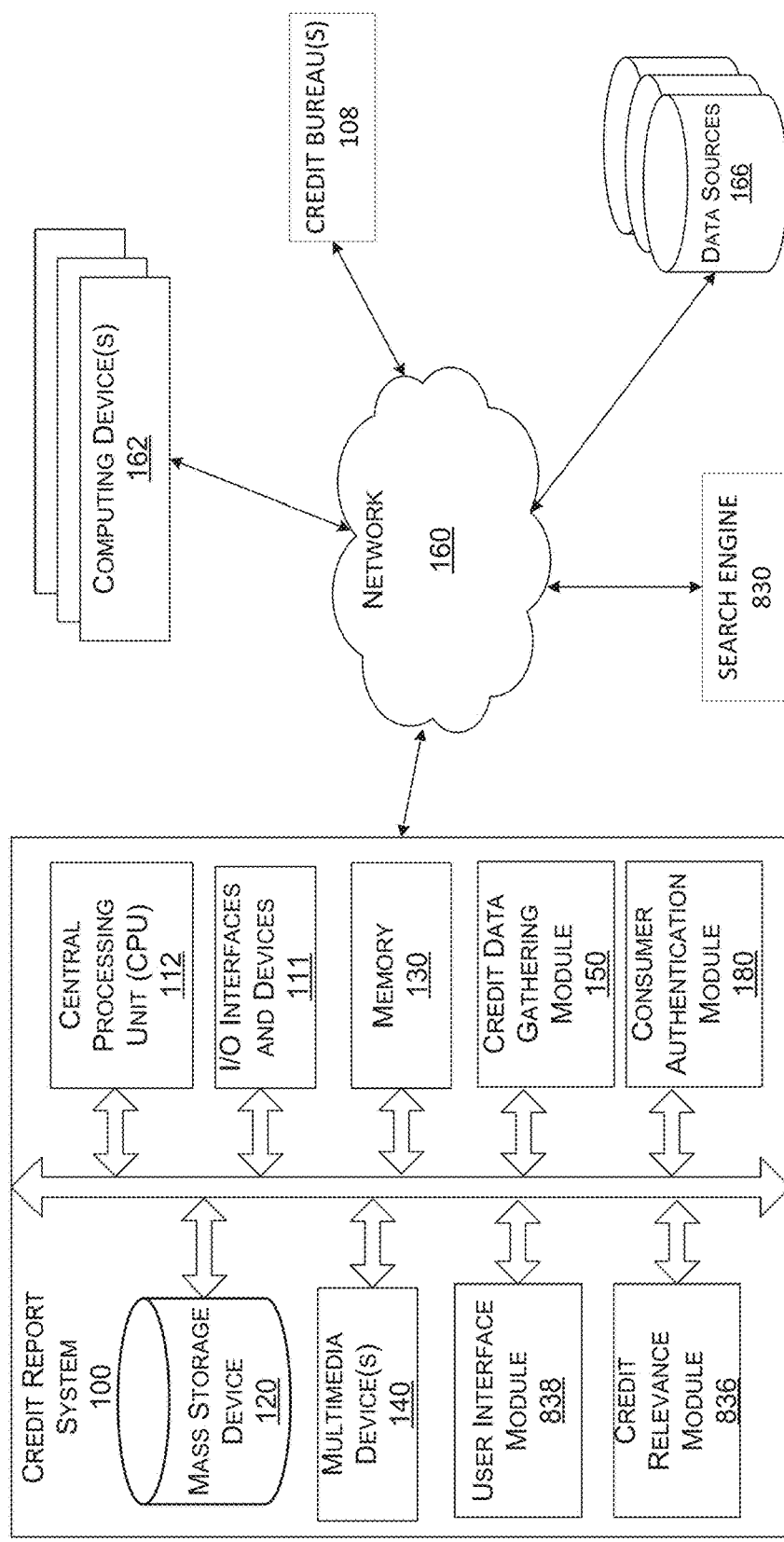
FIG. 10 is a block diagram illustrating one embodiment of components of a credit report system.

Example System Implementation and Architecture:

FIG. 10 is a block diagram showing an embodiment of a credit report system 100, which may be in communication with network 160 and various computing systems, such as computing devices 162, credit bureau(s) 108, and data sources 166, that are also in communication with the network 160. The credit report system 100 may be used to implement systems and methods described herein. In some embodiments, the other computing devices discussed herein, such as the computing devices 162, may include some or all of the same components as discussed below with reference to credit report system 100. Furthermore, depending on the embodiment, certain modules, such as the user interface module 110, credit data gathering module 150, credit relevance module 836, or consumer authentication module 180 may be performed by different and/or multiple computing devices. For example, certain functionality of the interface module 110 may be performed by the computing device 162, while other functionality of the interface module 110 may be performed by the credit report system 100.

In an embodiment, various software modules are included in the credit report system 100, which may be stored on the system itself, or on computer readable storage media separate from the system and in communication with the system via a network or other appropriate means. The credit report system 100 may include a credit data gathering module 150, which performs various tasks of gathering data used by the credit report system. Such data may include, for example, credit data retrieved from credit bureau(s) 108, which may access information from raw data sources 166, such as banks and creditors. In some embodiments credit data gathering module 150 accesses credit data from other sources.

The credit data may be retrieved via a network 160, via a dedicated communication channel, or by other means. In an embodiment, credit bureau 108 transmits credit data to the credit report system 100 via a secured communication channel to ensure the privacy and security of the credit data. In an embodiment, credit data is gathered on demand as required by the credit score report system. In another embodiment, credit data is gathered on a periodic basis independent of requests for information to the credit report system. In another embodiment, credit data is stored on the credit report system, in which case, retrieval of credit data from a credit bureau 108 may not be necessary.

In an embodiment, the credit report system 100 further includes user interface module 838, which may include executable instructions for constructing user interfaces or otherwise interacting with end users. User interface module 838 may include portions that are executed by the credit report system 100 and/or by the computing device 162. Thus, discussion herein of operations performed by the user interface module 838 may be performed entirely by the credit report system 100, entirely by the computing device 162, or some portions may be performed by the credit report system 100 while other portions are performed by the computing device 162. Furthermore, other computing systems may also perform all or some of the processes discussed with reference to the user interface module 838.

In one embodiment, the user interface module 838 may access data from credit data gathering module 150 or credit bureau(s) 108, and use that data to construct user interfaces that assist the user in visualizing a credit score and the underlying data used to construct a credit score. Such visualization may be presented to the end user and are designed to be easily manipulated and/or understood by the user. In an embodiment, the user interfaces transmitted by user interface module 838 are interactive. Various embodiments of the user interfaces that may be provided by user interface module 838 are shown and described throughout this specification. Variations on such interfaces and other possible interfaces will be known to those of skill in the art.

User interface module 838 may be configured to construct user interfaces of various types. In an embodiment, user interface module 838 constructs web pages to be displayed in a web browser or computer/mobile application. The web pages may, in an embodiment, be specific to a type of device, such as a mobile device or a desktop web browser, to maximize usability for the particular device. In some embodiments, the user interface module 838 may update or manipulate a user interface provided by another computer system. In an embodiment, user interface module 838 may also interact with a client-side application, such as a mobile phone application (an "app") or a standalone desktop application, and provide data to the application as necessary to display underlying credit score information.

The credit relevance module 836 may be configured to analyze data received from one or more sources, such as web pages accessed by a browser 820, search terms entered by a consumer, or the results of a search performed by a search engine 830. In some embodiments, computing device 162 may include a browser 820 and/or a search engine 830. Computing device 162 may access search engine 830 through network 160, in some embodiments using browser 820. The credit relevance module 836 may include portions that are executed by the credit report system 100, by credit bureau(s) 108, by search engine 830, and/or by the computing device 162. Thus, discussion herein of operations performed by the credit relevance module 836 may be performed entirely by the credit report system 100, entirely by credit bureau(s) 108, entirely by search engine 830, entirely by the computing device 162, or some portions may be performed by one system while other portions are performed another system. Furthermore, other computing systems may also perform all or some of the processes discussed with reference to the credit relevance module 836.

In some embodiments, the credit report system 100 includes a consumer authentication module 180, which may be configured to perform functions to verify the identity of a consumer using credit report system 100. The consumer authentication module 180 may request additional data from a consumer. For example, the consumer authentication module 180 may instruct the user interface module 838 to provide a user interface enabling the consumer to provide information sufficient to verify the consumer's identity. For example, the consumer authentication module 180 may receive information from the consumer through one of the user interfaces discussed in reference to FIG. 3A, 3B, 4A, or 4B. In some embodiments, the consumer authentication module 180 may verify the additional information received from the consumer with information stored on a database (e.g. a credit bureau database), or with a third party computing system which provides identity verification services.

Client computing device 162, which may comprise software and/or hardware that implements the user interface module 838, may be an end user computing device that comprises one or more processors able to execute programmatic instructions. Examples of such a computing device 162 are a desktop computer workstation, a smart phone such as an Apple iPhone or an Android phone, a computer laptop, a tablet PC such as an iPad, Kindle, or Android tablet, a video game console, or any other device of a similar nature. In some embodiments, the client computing device 162 may comprise a touch screen that allows a user to communicate input to the device using their finger(s) or a stylus on a display screen. The computing device 162 and/or credit report system 100 may comprise storage systems such as a hard drive or memory, or comprise any other non-transitory data storage medium. The storage systems may be configured to store executable instructions that may be executed by one or more processors to perform computerized operations on the client computing device, accept data input from a user (e.g. on the touch screen), and/or provide output to a user using the display. These executable instructions may be transmitted to another device for execution or processing by the device to implement the systems and methods described herein.

The computing device 162 may be connected to the credit report system 100, including credit data gathering module 150, or credit bureau 108 via a network 160. The computing device 162 may be connected to the network 160, which may include any combination of networks, such as local area, wide area, Internet, etc., by way of a wired network, such as an ethernet LAN or cable modem, or via a wireless method, such as through an 802.11 access point or via a cell phone network. The network 160 allows computing devices to send (i.e. transmit) and receive electronic transmissions.

The computing device 162 may also comprise one or more client program applications, such as a mobile "app" (e.g. iPhone or Android app) that may be used to visualize data, and initiate the sending and receiving of messages in the credit report system. This app may be distributed (e.g. downloaded) over the network to the client computing device directly from a credit bureau 108, from the credit report system 100, credit data gathering module 150, user interface module 838, or from various third parties such as an Apple iTunes repository or Android app store. In some embodiments, the application may comprise a set of visual interfaces that may comprise templates to display a consumer's credit data information from a credit report or associated attributes. In some embodiments, as described above, visual user interfaces may be downloaded from another server or service, such as the credit report system 100. This may comprise downloading web page or other HTTP/HTTPS data from a web server and rendering it through the "app". In some embodiments, no special "app" need be downloaded and the entire interface may be transmitted from a remote Internet server to computing device 162, such as transmission from a web server that is a part of the credit report system 100 to an iPad, and rendered within the iPad's browser.

As described above, some embodiments may include portions that are executed by the credit report system 100 and/or by the computing device 162, or are entirely executed by the credit report system 100 or the computing device 162. Thus, discussion herein of any structure (e.g. CPU, memory, etc.) of the computing device 162 or operations performed by the computing device 162, credit relevance module 836, consumer authentication module 180, or user interface module 838 may be equally applied to the credit report system 100. Furthermore, other computing systems may also perform all or some of the processes discussed with reference to the various modules.

The credit report system 100 includes, for example, a personal computer that is IBM, Macintosh, iOS, Android or Linux/Unix compatible or a server or workstation. In one embodiment, the credit report system 100 comprises a server, a laptop computer, a smart phone, a personal digital assistant, a kiosk, or a media player, for example. In one embodiment, the exemplary credit report system 100 includes one or more central processing unit ("CPU") 112, which may each include a conventional or proprietary microprocessor. The credit report system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the credit report system 100 may be connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing device 162 may be combined into fewer components and modules or further separated into additional components and modules, and executed in software, hardware, or a combination of hardware and software.

The computing device 162 and credit report system 100 are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, or other compatible operating systems. In Macintosh systems, the operating system may be any available operating system, such as MAC OS X. In other embodiments, the computing device 162 and/or credit report system 100 may be controlled by a proprietary operating system. Conventional operating systems control and schedule computer processes for execution, perform memory management, provide file system, networking, I/O services, and provide a user interface functionality usable by the user interface module 838, such as a graphical user interface ("GUI"), among other things.

The exemplary computing device 162 and/or credit report system 100 may include one or more commonly available input/output (I/O) devices and interfaces 111, such as a keyboard, mouse, touchscreen, and printer. In one embodiment, the I/O devices and interfaces 111 include one or more display devices, such as a monitor or touchscreen, that allows the visual presentation of data to a user. More particularly, a display device provides for the presentation of GUIs, application software data, and multimedia presentations, for example. The computing device 162 and/or credit report system 100 may also include one or more multimedia devices 140, such as speakers, video cards, graphics accelerators, and microphones, for example.

In the embodiment of FIG. 10, the I/O devices and interfaces 111 provide a communication interface to various external devices. In the embodiment of FIG. 10, the computing device 162 is electronically coupled to a network 160, which comprises one or more of a LAN, WAN, and/or the Internet, for example, via a wired, wireless (such as 802.11 networks or a cell phone network), or combination of wired and wireless, communication link. The network 160 communicates with various computing devices and/or other electronic devices via wired or wireless communication links.

In some embodiments information may be provided to the computing device 162 over the network 160 from a credit report system 100 and/or a credit bureau 108. Similarly, in some embodiments, information may be provided to the credit report system 100 over the network 160 from a credit bureau 108. The credit report system 100 and the credit bureau 108 may include one or more internal and/or external data sources 166. The data sources 166 may include internal and external data sources which store, for example, credit bureau data and/or other consumer data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 10, the credit report system 100 includes various modules that may be stored in the mass storage device 120 as executable software codes that are executed by the CPU 112. The modules included in the credit report system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

User interface module 838 may generate and render one or more visual user interfaces (such as the user interfaces illustrated and described with respect to FIGS. 1A-6) based on upon the received credit information. By interacting with these user interfaces, a user of computing device 162 may view various information about credit score goals (or thresholds) and alerts.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, such as the computing device 162, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Like the credit report system 100, computing device 162 and credit bureau(s) 108 may comprise similar computing hardware, software, and functionality as described above for credit report system 100.

In some embodiments, the system distinguishes between the initial transmission of credit data required for user interfaces, and subsequent transmissions of user interface data so that it may transmit only portions that are necessary to update a credit score user interface or other portions of the user interface, such as search results or web pages. This may be done, for example, using an XMLHttpRequest (XHR) mechanism, a data push interface, or other communication protocols.

Other Embodiments

Although the foregoing systems and methods have been described in terms of certain embodiments, other embodiments will be apparent to those of ordinary skill in the art from the disclosure herein. Additionally, other combinations, omissions, substitutions and modifications will be apparent to the skilled artisan in view of the disclosure herein. While some embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

What is claimed is:

1. A computing system comprising:
one or more hardware computer processors; and
one or more storage devices configured to store software instructions configured for execution by the one or more hardware computer processors to cause the computing system to:
receive, from a user computing device, instructions to access information over a network;
access information according to the instructions received from the user computing device;
access a data structure comprising a plurality of terms, wherein the terms are related to credit data or affecting credit data;
parse the received instructions or the accessed information to identify any of the terms in the data structure that are included in the received instructions or the accessed information;
based at least on the identified any of the terms included in the received instructions or the accessed information, determining that credit data information of the user is to be provided to the user, and
in response to determining that the credit data information of the user is to be provided to the user based at least on identifying any of the terms included in the received instructions or the accessed information in the terms related to credit data or affecting credit data in the data structure:
  receive one or more indications that the computing system has previously authenticated the user on the user computing device;
  provide the user with a first access control configured to receive one or more user identity confirming inputs;
  receive the one or more user identity confirming inputs, including an answer to a security question;
  determine whether the one or more user identity confirming inputs authenticate the user using the one or more hardware computer processors; and
  in response to determining that the user is authenticated:
    retrieve, from a credit bureau, personalized credit data of the user; and
    automatically generate and transmit a page to the user computing device, the page comprising:
      at least a portion of the personalized credit data of the user, and
      at least a portion of the accessed information; or
  in response to determining that the user is not authenticated:
    transmit a page to the user computing device, the page comprising at least a portion of the accessed information.

2. The computing system of claim 1, wherein the instructions to access information over the network are one or more search queries and the accessed information are search results.

3. The computing system of claim 1, wherein the one or more indications includes one or more cookies or tags stored on the user computing device.

4. The computing system of claim 1, wherein the computing system generates the security question using data from a credit bureau, a credit database, or other database with identifying information.

5. The computing system of claim 1, wherein the user generates the security question.

6. The computing system of claim 1, wherein the one or more user authenticating inputs comprise a username and a password.

7. The computing system of claim 1, wherein the personalized credit data comprises a credit score of the user, financial account information regarding one or more financial accounts of the user, or a level of credit used by the user.

8. The computing system of claim 1, wherein the portion of the personalized credit data of the user in the page is displayed as one or more of: a banner, a pop-up, or a widget.

9. The computing system of claim 1, wherein the computing system is further configured to:
  access location data of the user; and
  determine whether the user is considering a financial transaction based at least partly on the location data.

10. A computing system comprising:
  one or more hardware computer processors; and
  one or more storage devices configured to store software instructions configured for execution by the one or more hardware computer processors to cause the computing system to:
    receive, from a user computing device, instructions to access information over a network;
    access information according to the instructions received from the user computing device;
    access a data structure comprising a plurality of terms, wherein the terms are related to credit data or affecting credit data;
    parse the received instructions or the accessed information to identify any of the terms in the data structure that are included in the received instructions or the accessed information;
    access location data of the user;
    based at least on the identified any of the terms included in the received instructions or the accessed information, determining that credit data information of the user is to be provided to the user, and
    in response to determining that the credit data information of the user is to be provided to the user based at least on identifying any of the terms included in the received instructions or the accessed information in the terms related to credit data or affecting credit data in the data structure:
      provide the user with a first access control configured to receive one or more user identity authenticating inputs;
      receive the one or more user identity authenticating inputs;
      determine whether the one or more user identity authenticating inputs authenticate the user using the one or more hardware computer processors;
      in response to determining that the user is authenticated:
        retrieve, from a credit bureau, personalized credit data of the user; and
        automatically generate and transmit a page to the user computing device, the page comprising:
          at least a portion of the personalized credit data of the user,
          at least a portion of the accessed information; and
          a map generated at least partly based on the location data.

11. A computing system providing a page having credit data to a user comprising:
  one or more hardware computer processors; and
  one or more storage devices configured to store software instructions configured for execution by the one or more hardware computer processors in order to cause the computing system to:
    receive, from a user computing device, instructions to access information over a network;
    access information according to the instructions received from the user computing device;
    access a data structure comprising a plurality of terms, wherein the terms are related to credit data or affecting credit data;
    parse the received instructions or the accessed information to identify any of the terms in the data structure that are included in the received instructions or the accessed information;
    based at least on the identified any of the terms included in the received instructions or the accessed information matching a predefined criteria indicative that the user is considering a financial transaction, determining that credit data information of the user is to be provided to the user, and
    in response to determining that the credit data information of the user is to be provided to the user based at least on identifying any of the terms included in the received instructions or the accessed information in the terms related to credit data or affecting credit data in the data structure:

determine, using the one or more hardware processors, whether an identity of the user is authenticated on the user computing device based at least in part on a prior user authentication, wherein the user computing device determines the prior user authentication based at least in part on one or more cookies or tags stored on the user computing device;

in response to determining the identity of the user is authenticated:

retrieve, from a credit bureau, personalized credit data of the user; and using the accessed information and the personalized credit data, automatically generate and transmit to a browser of the user computing device a page comprising:

at least a portion of the personalized credit data of the user, as retrieved from the credit bureau, and at least a portion of the accessed information.

12. The computing system of claim 11, wherein the determining that the predefined criteria indicative that the user is considering the financial transaction comprises:

identifying a first term in the instructions and/or the accessed information according to the instructions;

identifying, based on the identified first term, a second term associated with the first term included in the instructions and/or the accessed information according to the instructions; and calculating a threshold quantity of terms based at least partly on the first term and the second term.

13. The computing system of claim 11, wherein the determining that the predefined criteria indicative that the user is considering the financial transaction comprises:

identifying respective locations of the one or more identified terms in the instructions and/or the accessed information according to the instructions;

weighing the one or more identified terms based on the location of the one or more identified terms; and calculating whether the one or more identified terms include a threshold quantity of terms based at least in part on the one or more identified terms and their associated weights.

14. The computing system of claim 11, wherein the determining that the predefined criteria indicative that the user is considering the financial transaction comprises:

assigning a weight associated with each of the one or more identified terms; and calculating whether the one or more identified terms include a threshold quantity of terms based at least in part on the one or more identified terms and their associated weights.

15. A method for providing credit data in search results, the method comprising:

receiving a search query comprising search terms;

retrieving, from a search engine, search result data responsive to the search query, the search result data comprising a plurality of search results each including one or more of the search terms of the search query;

parsing the search result data and/or the search query to identify one or more financial terms that are included in a listing of terms related to financial transactions;

based at least on the identified any of the terms included in the received search query or the retrieved search result data, determining that credit data information of a user is to be provided to the user, and in response to determining that the credit data information of the user is to be provided to the user based at least on identifying any of the terms included in the received search query or the retrieved search result data in the terms related to credit data or affecting credit data:

determining whether an identity of the user is authenticated on a computing system based at least in part on a prior user authentication using one or more hardware processors;

determine that the search result data includes a site associated with the computing system; and in response to finding no prior user authentication on the computing system:

provide the user with a first access control configured to receive one or more user identity authenticating inputs;

receive the one or more user identity authenticating inputs;

determine whether the one or more user identity authenticating inputs authenticate the user;

in response to determining that the user is authenticated:

retrieving, from a credit bureau, personalized credit data of the user; and using the retrieved search result data and the personalized credit data, automatically generate and transmit to a browser of the user computing device a composite page comprising:

at least a portion of the personalized credit data of the user, as retrieved from the credit bureau, and at least a portion of the plurality of search results.

\* \* \* \* \*